United States Patent
Horn et al.

(10) Patent No.: US 10,264,515 B2
(45) Date of Patent: Apr. 16, 2019

(54) ENHANCED ACCESS NETWORK QUERY PROTOCOL (ANQP) SIGNALING TO SCALE TO SUPPORT LARGE NUMBERS OF SERVICE PROVIDERS AT AN ACCESS POINT (AP)

(71) Applicant: QUALCOMM Incorporated, San Diego, CA (US)

(72) Inventors: Gavin Bernard Horn, La Jolla, CA (US); Stefano Faccin, Hayward, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/807,820

(22) Filed: Jul. 23, 2015

(65) Prior Publication Data
US 2016/0183168 A1    Jun. 23, 2016

Related U.S. Application Data

(60) Provisional application No. 62/095,719, filed on Dec. 22, 2014.

(51) Int. Cl.
*H04W 48/14* (2009.01)
*H04W 48/16* (2009.01)
(Continued)

(52) U.S. Cl.
CPC ............. *H04W 48/14* (2013.01); *H04L 67/16* (2013.01); *H04L 69/08* (2013.01); *H04W 48/16* (2013.01); *H04W 48/20* (2013.01); *H04W 48/02* (2013.01)

(58) Field of Classification Search
CPC ..... H04W 48/14; H04W 48/18; H04W 48/16; H04W 48/20; H04W 48/02; H04L 69/08; H04L 67/16
See application file for complete search history.

(56) References Cited

U.S. PATENT DOCUMENTS

| 8,934,867 | B2 | 1/2015 | Shanmugavadivel et al. |
| 2005/0213566 | A1* | 9/2005 | Jutila ............... H04W 48/18 370/352 |

(Continued)

FOREIGN PATENT DOCUMENTS

WO    WO-2014106434 A1    7/2014

OTHER PUBLICATIONS

PCT/US2015/065330—International Preliminary Report on Patentability Chapter II (IPEA/409), Jun. 22, 2017, 30 pages.*

(Continued)

*Primary Examiner* — Brian J Gillis
*Assistant Examiner* — Chhian Ling
(74) *Attorney, Agent, or Firm* — Loza & Loza, LLP

(57) ABSTRACT

A client device may determine whether to obtain an element of information related to a service parameter from an access node. The access node may be associated with a plurality of connectivity access networks. The element of information can be selected and associated with a query. The query can be derived and configured according to one of a plurality of modes. The query can be sent as an over-the-air message to the access node. A service query protocol (SQP) server may be coupled to the access node. The query may be obtained at the SQP server from client device via the access node. A response to the query may be derived based on the element of information associated with the query and the mode of the query. The response may be sent from the access node to the client device.

30 Claims, 20 Drawing Sheets

(51) Int. Cl.
  *H04W 48/20* (2009.01)
  *H04L 29/06* (2006.01)
  *H04L 29/08* (2006.01)
  *H04W 48/02* (2009.01)

(56) References Cited

U.S. PATENT DOCUMENTS

| | | | |
|---|---|---|---|
| 2006/0172741 A1* | 8/2006 | Jeong | H04W 36/0061 455/446 |
| 2013/0267203 A1* | 10/2013 | Qiang | H04W 48/18 455/411 |
| 2014/0010171 A1 | 1/2014 | Morrill et al. | |
| 2014/0092779 A1 | 4/2014 | Seok et al. | |
| 2014/0112327 A1 | 4/2014 | Calcev et al. | |
| 2014/0126563 A1 | 5/2014 | Chen et al. | |
| 2014/0295913 A1 | 10/2014 | Gupta | |
| 2014/0313936 A1* | 10/2014 | You | H04W 48/14 370/254 |
| 2014/0341072 A1* | 11/2014 | Cai | H04W 48/14 370/254 |
| 2014/0359148 A1 | 12/2014 | Cherian et al. | |
| 2015/0049714 A1 | 2/2015 | Ghai | |
| 2015/0117430 A1* | 4/2015 | Zhuang | H04L 67/16 370/338 |
| 2018/0098275 A1* | 4/2018 | Chen | H04W 48/14 |

OTHER PUBLICATIONS

International Search Report and Written Opinion—PCT/US2015/065330—ISA/EPO—dated Feb. 18, 2016.

* cited by examiner

| CAN ID or SP ID<br>Element of Information | ... | Access Node A of CAN ID A | Access Node L of CAN ID A | Access Node A of CAN ID M | ... | Access Node N of CAN ID M | Service Provider A (SP ID A) | Service Provider B (SP ID B) | ... | Service Provider X (SP ID X) |
|---|---|---|---|---|---|---|---|---|---|---|
| Include CAN or SP in default response to SQP query? [Yes=1 or No=0] | ... | 1 | 1 | 0 | ... | 0 | 1 | 0 | ... | 1 |
| CAN or SP member of hidden group? [Yes=1 or No=0] | ... | 0 | 0 | 1 | ... | 1 | 0 | 1 | ... | 0 |
| Network service identifier P (Voice over IP) [Yes=1 or No=0] | ... | 1 | 1 | 1 | ... | 1 | 1 | 1 | ... | 1 |
| Network service identifier Q (Voice over LTE) [Yes=1 or No=0] | ... | 1 | 1 | 0 | ... | 0 | 1 | 0 | ... | 1 |
| Network service identifier R (Streaming video) [Yes=1 or No=0] | ... | 1 | 1 | 1 | ... | 1 | 1 | 1 | ... | 1 |
| Network service identifier S (GPS related service) [Yes=1 or No=0] | ... | . | . | . | ... | . | . | . | ... | . |
| User friendly name and/or link to icon identifying CAN or SP | | | | | | | | | | |
| Basic service set identification (BSSID) or MAC Address | | | | | | | | | | |
| Service Set Identifier (SSID) | | | | | | | | | | |
| AAA Server information | | | | | | | | | | |
| On-line Sign-Up (OSU) availability [e.g., 1 or 0] | | | | | | | | | | |
| OSU Server Information | | | | | | | | | | |
| Venue Group [e.g., business, educational, outdoor] | | | | | | | | | | |
| Venue Type [e.g., stadium, museum, private residence, etc.] | | | | | | | | | | |
| Network Authentication Type | | | | | | | | | | |
| Network Address Identifier (NAI) realm(s) list/information | | | | | | | | | | |
| Third-generation cellular network availability information | | | | | | | | | | |
| Emergency alert system message uniform resource identifier | | | | | | | | | | |
| Access Node Geospatial Location [e.g., latitude-longitude] | | | | | | | | | | |
| Access Node Civic Location [e.g., street address] | | | | | | | | | | |
| Network Code | | | | | | | | | | |
| Country Code | | | | | | | | | | |
| Internet Connectivity [e.g., 1 or 0] | | | | | | | | | | |
| Additional Step Required for Access (ASRA) [e.g., 1 or 0] | | | | | | | | | | |
| Access Network Type: [e.g., free public network, chargeable public network, private network with guest access, etc.] | | | | | | | | | | |
| Identifier(s) of Roaming Consortium(s) whose networks are accessible via this Access Node | | | | | | | | | | |
| IP Address Type [e.g., IPv6, IPv4] | | | | | | | | | | |
| Link Status [e.g., Link Up, Link Down, Link in Test State] | | | | | | | | | | |
| At Capacity [e.g., set to 1 if no additional network access devices will be permitted to associate to the access node] | | | | | | | | | | |
| ... | | | | | | | | | | |

FIG. 4

ENHANCED ACCESS NETWORK QUERY PROTOCOL (ANQP) SIGNALING TO SCALE TO SUPPORT LARGE NUMBERS OF SERVICE PROVIDERS AT AN ACCESS POINT (AP)

This application claims priority to U.S. Provisional Application No. 62/095,719, filed Dec. 22, 2014, titled Enhanced ANQP Signaling To Scale To Support Large Numbers Of Service Providers At A Single Access Point (AP), the contents of which are incorporated by reference herein.

FIELD

The present disclosure relates generally to communication devices and methods of signaling that facilitate acquisition of service information from an access point, and more particularly to the acquisition of such information when the access point is coupled to a plurality of connectivity access networks.

BACKGROUND

Wireless communication systems, including wireless mobile systems, are widely deployed to provide various telecommunication services. Telecommunication services include voice services, data services, voice and data connectivity, Internet connectivity, voice over Internet protocol (VoIP), wireless point-to-point, video, streaming video, videotelephony, messaging, and broadcasting to name a few.

Typical wireless communication systems employ multiple-access technologies. Examples of such multiple-access technologies include code division multiple-access (CDMA), time division multiple-access (TDMA), frequency division multiple-access (FDMA), orthogonal frequency division multiple-access (OFDMA), single-carrier frequency division multiple-access (SC-FDMA), and time division synchronous code division multiple-access (TD-SCDMA).

Multiple-access technologies have been adopted in various telecommunication standards to provide common protocols that enable wireless and mobile devices to communicate on a municipal, national, regional, and global level. Wireless services are offered by many providers using various standards on cellular local area networks (cellular LANs) and wireless local area networks (WLANs). Standards applicable to cellular LANs include those promulgated by the $3^{rd}$ Generation Partnership Project (3GPP), such as 3G, 4G, Long Term Evolution (LTE), and LTE-Advanced (LTE-A). LTE-A provides a set of enhancements to the Universal Mobile Telecommunications System (UMTS) mobile standard promulgated by the 3GPP. A next evolution of the 3GPP standards is being considered; it may be referred to as 5G. Standards applicable to WLANs include those promulgated by the Institute of Electrical and Electronics Engineers (IEEE), such as IEEE 802.11 (commonly and/or variously referred to as Wi-Fi® and/or Hotspot 2.0). IEEE 802.11 is a set of media access control (MAC) and physical layer (PHY) specifications for implementing WLAN communication.

Communication systems using multiple-access technologies simultaneously support communication for multiple user devices. In general, a user device serves as an interface to a network. A user device can take on any number of forms. It may be a mobile hand-held device such as a cellular phone, a laptop, or notepad computer, a wrist-worn device, or a device configured to be worn in any way by a user. It may alternatively be a fixed device, such as a computer/cellular phone interface used in a building alarm system, or a machine-to-machine (M2M) type device that may facilitate communication between, for example, a television, refrigerator, bathroom scale, and/or washing machine. It need not receive input through a human-machine interface (e.g., a physical or image based keyboard or a voice command interface).

In the context of 3GPP, a user device is generally referred to as a user equipment (UE). In the context of IEEE 802.11, a user device is generally referred to as a station (STA). However, many user devices can communicate using both a cellular LAN and a WLAN (e.g., many cellular phones communicate over both a 3GPP network and an IEEE 802.11 network). Accordingly, the same user device may be both a UE and a STA. Furthermore, in standards other than 3GPP and IEEE 802.11, or in accordance with non-standard based protocols or practices, a user device may be referred to by other names including, for example, a client device or a terminal.

Access Network Query Protocol (ANQP) is a protocol defined by the IEEE and the Wi-Fi Alliance®. The Wi-Fi Alliance is a global non-profit industry association that certifies Wi-Fi® products for interoperability and industry-standard security protections. ANQP is presently defined for IEEE 802.11. ANQP provides a protocol that allows a STA to query a WLAN access point (AP) (e.g., an AP under 802.11, Wi-Fi, or Hotspot 2.0) without requiring a security association with the AP. A STA can use ANQP to perform network discovery and selection at an AP. In addition, the STA can discover information, at the AP level, about AP features/characteristics (e.g., load) and supported services (e.g., including supported service providers, connectivity type, etc.). An example of an AP may be a wireless modem or wireless router at a home, store, office, or in a vehicle. APs may be indoor or outdoor. Outdoor APs may appear in cities, suburbs, and/or college, corporate, or government campuses to provide, for example, Internet access to a community.

An AP may traditionally be thought of a radio device that connects to a network (typically the Internet) via an Internet Service Provider (ISP). Consequently, connectivity to a network via an AP, for a given STA, is traditionally determined by one ISP.

As implemented today under IEEE 802.11u, the concept of a 3GPP-style radio access network (RAN) provider that is separate from a 3GPP-style connectivity access network provider does not exist. As implemented today, an IEEE 802.11 AP fulfills the general functions of both the RAN and connectivity access network providers. In other words, using the terminology of 3GPP in the context of IEEE 802.11, the RAN provider and the connectivity access network provider are always the same entity. This is in contrast to 3GPP systems, where the RAN provider and the connectivity access network provider may be different entities.

ANQP, being defined for IEEE 802.11, does not contemplate, and is unable to support, a plurality of connectivity access network providers at a single AP. Therefore, a STA can determine what services are supported by a given AP, but only under the assumption that the AP is associated with a single entity that functions as a combination of the 3GPP-style RAN and connectivity access network providers. This is problematic, at least because each AP can provide connectivity to only a limited number of service providers.

It would be beneficial to allow an AP to be shared by a plurality of connectivity access network providers. This would allow for an increase in the number of service providers (and their associated services) available to a STA at the AP. In such a scenario, a given AP may offer a STA a greater number of choices of service providers. However, a greater number of choices in service providers at a given AP presents problems of its own. ANQP does not scale well; it is cumbersome and not flexible for queries involving a large number of service providers.

Current idle mode selection behavior is for an AP to perform public land mobile network (PLMN) selection, and then perform cell selection with the selected PLMN. PLMNs are identified using a PLMN identifier (PLMN ID). Presently, the PLMN ID has two components. The first component is the Mobile Country Code (MCC). The MCC is 3 digits. It uniquely identifies a country. The second component is the Mobile Network Code (MNC). The MNC is a 2 or 3 digit number (depending on the value of the MCC). The MNC identifies the operator within the country. At best, using a 3 digit MNC, only 1000 operators can be defined for a given country. The number of operators in many countries has already, or soon will, exceed 1000. Accordingly, it is not feasible to provide all operators (e.g., operators of WLANs under IEEE 802.11, operators of cellular LANs under 3GPP, etc.) with PLMNs.

Furthermore, APs under IEEE 802.11, are known to periodically broadcast over-the-air messages, to advertise that a certain limited number of service providers are available at the AP, and to provide the identities of the certain limited number of service providers being advertised. Such broadcasts may be made, for example, by a beacon such as a system information block-type 1 (SIB1) transmission. However, only six PLMN IDs can be included in a current SIB1 transmission. Even if a new identifier was introduced to enable a larger access network identifier space, it would still not enable an access node (e.g., access point or eNodeB) to support a large number of associated service providers.

Furthermore, if an AP is shared by more than a fixed maximum number of service providers that can be advertised in a broadcast, the advertisement cannot inform client devices of an opportunity to select from among the unadvertised service providers that share the AP with the advertised service providers. Such unadvertised service providers are therefore unintentionally hidden from client devices.

Additionally, certain service providers do not want their networks to be advertised to the public in a beacon transmission. An example of such network might be a closed subscriber group (CSG). Access to a CSG is available to subscribers of the CSG, but not to the general public. These service providers are therefore intentionally hidden from client devices.

Nevertheless, there is a growing need to support an ever growing number of services and/or service providers at each type of access node (e.g., AP access nodes under IEEE 802.11 and eNB access nodes under 3GPP). Consequently, the inability of ANQP to scale to support a large number of services and/or service providers at a given access node is problematic.

Accordingly, problems exist as to how to allow a client device to obtain a selective list of connectivity access network providers, services, and/or service providers from an access node and/or how to select which of a plurality of connectivity access network providers, services, and/or service providers should appear on a default list of connectivity access network providers, services, and/or service providers to be advertised to client devices from the access node.

SUMMARY

According to one aspect, a method that may be operational at a client device may include determining whether to obtain an element of information related to a service parameter from an access node. The access node may be shared by a plurality of connectivity access networks. The method may further include selecting the element of information based on a result of the determining step, deriving a query associated with the element of information, and sending the query as an over-the-air message from the client device to the access node. The query may be configured according to one of a plurality of modes. According to a first mode, the element of information may be a null-value, and the query may cause the access node to return a default response. The default response may include a listing of identifiers of connectivity access networks and/or service providers. The listing may include only those connectivity access networks and/or service providers that are configured to enable the client device to obtain access to services. According to one aspect, only those connectivity access networks and/or service providers that pre-authorized inclusion of their identities in the default response are presented in the default response. Other connectivity access networks and/or service providers may be hidden from presentation in the default response.

According to a second mode, when the element of information is a service, the method further includes obtaining a set of identifiers of connectivity access networks and/or service providers that support the service. The method may still further include obtaining a list of additional services supported by the identified connectivity access networks and/or service providers that support the service. The method may still further include obtaining a list of devices supported by the identified connectivity access networks and/or service providers that support the service According to still another aspect, when the query is configured according to the second mode and the element of information is an identifier of a connectivity access network and/or a service provider, the method may include obtaining a list of services supported by the identified connectivity access network and/or service provider.

According to still another aspect, when the query is configured according to a third mode and the element of information is an identifier of a connectivity access network and/or service provider, the method may include obtaining an indication of whether credentials of the connectivity access network and/or service provider are available for use by the client device. This aspect may hold even when the identifier of the connectivity access network and/or service provider was not provided to the client device in an over-the-air message broadcast received prior to determining whether to obtain the element of information related to the service parameter from the access node.

According to another aspect, the query may be sent and a response may be received via wireless communication between the client device and the access node. The wireless communication may be accomplished using authenticated or unauthenticated messages. According to various aspects, messages may be conveyed in layer 3 messages, radio resource control (RRC) signaling, and/or a non-access stratum (NAS) signaling.

According to one feature, a client device may include a network interface and a processing circuit coupled to the network interface. According to one aspect, the processing circuit may be configured to determine whether to obtain an element of information related to a service parameter from an access node, where the access node may be shared by a plurality of connectivity access networks. According to this aspect, the processing circuit may select the element of information related to the service parameter if the processing circuit determined to obtain the element of information. Furthermore, the processing circuit may derive a query, associated with the element of information. The processing circuit may configure the query according to one of a plurality of modes. Once derived/configured, the query may be sent as an over-the-air message from the client device to the access node.

According to another aspect, a method that may be operational at a server. The server may implement a service query protocol (SQP). Accordingly, the server may be referred to as a service query protocol server (SQP server). The server (e.g., SQP server) may be coupled to an access node. The method may include obtaining a query associated with an element of information. The query may be configured according to one of a plurality of modes. The method may include determining a response to the query based on the element of information associated with the query and the configured mode of the query. The method may further include sending the response. The query may have been received from a client device via the access node.

According to the first mode, when the element of information is a null-value, the response to the query may be a default response including a listing of identifiers of connectivity access networks and/or service providers sharing the access node. According to another aspect, prior to obtaining the query, a message that does not include identifiers of all connectivity access networks and/or service providers associated with the access node may be broadcast from the access node. The identity of an omitted connectivity access network and/or service provider may not be broadcast to hide the identity from the client device. According to such an aspect, if the query includes a connectivity access network and/or service provider identifier that was not included in the message, the query may cause the access node to return an indication of whether credentials of the hidden connectivity access network and/or service provider are available for use by the client device.

According to a second mode, the element of information may be a service, and the query may cause the access node to return a set of identifiers of connectivity access networks and/or service providers that support the service. The query may also cause the access node to further return a list of additional services supported by each of the identified connectivity access networks and/or service providers that support the service. The query may alternatively or additionally cause the access node to return a list of devices supported by each of the identified connectivity access networks and/or service providers that support the service.

According to a third mode, when the element of information is an identifier of a connectivity access network and/or a service provider, the query may cause the access node to return an indication of whether credentials of the connectivity access network and/or service provider are available for use by the client device.

According to various aspects, the query is sent and a response is received via wireless communication between the client device and the access node. The wireless communication may be accomplished using authenticated or unauthenticated messages. According to aspects, messages may be conveyed in layer 3 messages, radio resource control (RRC) signaling, and/or a non-access stratum (NAS) signaling.

According to one feature, an SQP server may include a network interface and a processing circuit coupled to the network interface. The processing circuit may be configured to obtain a query associated with an element of information. The query may be configured according to one of a plurality of modes. The processing circuit may further be configured to determine a response to the query based on the element of information associated with the query and the mode of the query and may still further be configured to send the response to the query.

DRAWINGS

Various features, nature and advantages may become apparent from the detailed description set forth below when taken in conjunction with the drawings in which like reference characters identify correspondingly throughout.

FIG. 4 is a conceptual diagram of an exemplary table that may be useful in connection with an explanation of aspects and features of elements of information as described herein.

DETAILED DESCRIPTION

Figure 1:
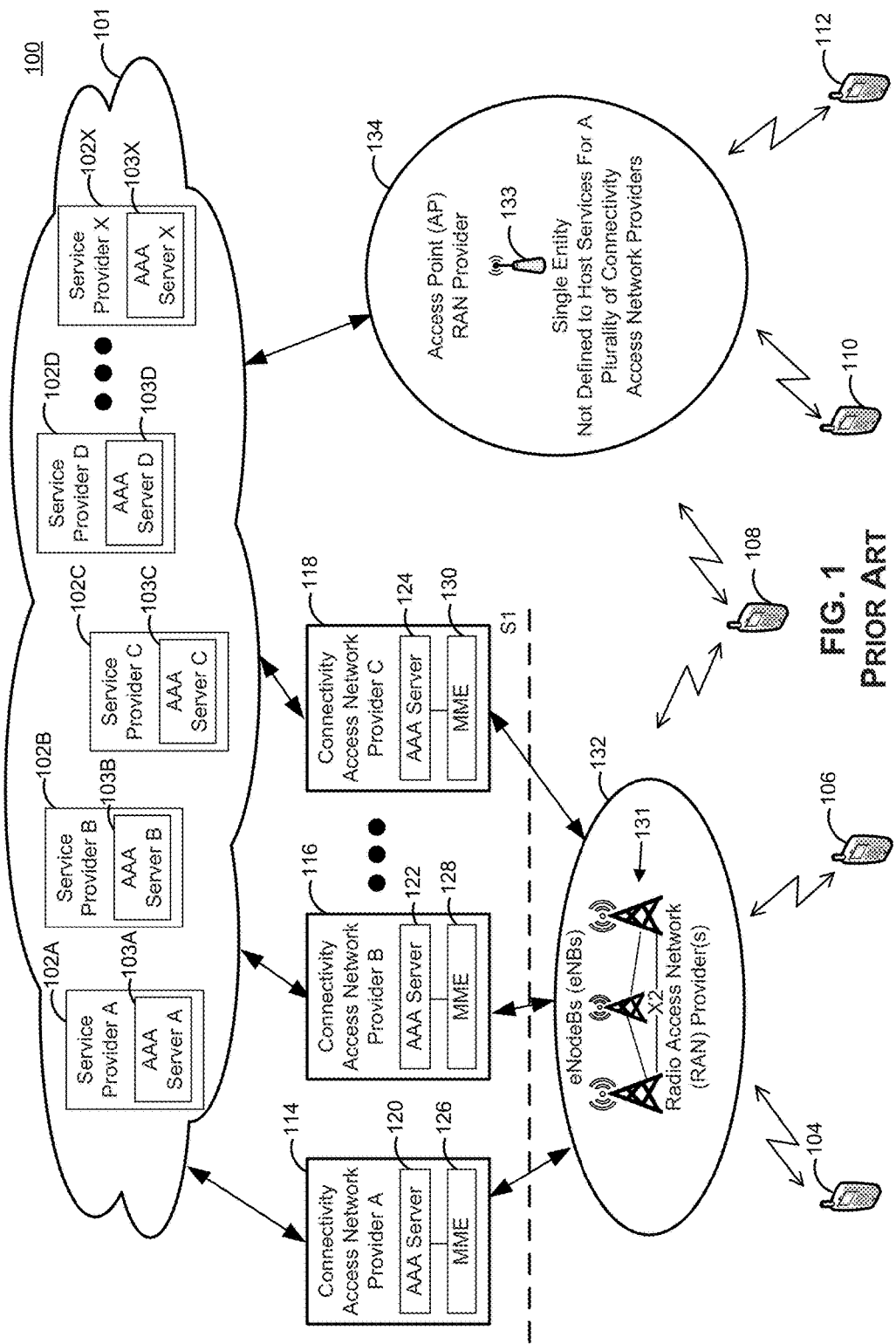
FIG. 1 illustrates a network architecture according to the prior art.

The detailed description set forth below in connection with the appended drawings is intended as a description of various configurations and is not intended to represent the only configurations in which the various concepts described herein may be practiced. The detailed description includes details for the purpose of providing a thorough understanding of the various concepts. However, it will be apparent to those skilled in the art that these concepts may be practiced without these details. In some instances, the details of well-known structures and components are shown in block diagram form in order to avoid obscuring such concepts. Like reference numbers appearing in various figures are understood to have been described in connection with an earlier figure.

In the following description, reference is made to the accompanying drawings in which is shown, by way of illustration, specific aspects and features described in the disclosure. The aspects and features described in the disclosure are intended to be provided in sufficient detail to enable those skilled in the art to practice the invention. Other aspects and features may be utilized and changes may be made to that which is disclosed without departing from the scope of the disclosure. The following detailed description is not to be taken in a limiting sense, and the scope of the aspects and features described and illustrated herein is defined only by the appended claims.

As used herein, a "client device" may be any device that provides a human and/or a machine with an interface to a serving network. The term "client device" may be used herein to refer to a wireless device, mobile device, subscriber device, network access device, mobile phone, mobile communication device, mobile computing device, digital tablet, smart phone, user equipment, user device, user terminal, terminal, among other devices. The term "network access node" includes any device that provides wireless network connectivity between a client device and a serving network. Networks external to a core network of a cellular communication system, such as a packet data network (PDN) (e.g., the Internet) and an Internet Protocol (IP) Multimedia Service (IMS) network may be exemplified herein by reference to the PDN, however, nothing is intended to limit networks external to the core network to PDNs or IMS networks. Furthermore, aspects and features presented herein are exemplary. Nothing is intended to limit any aspect or feature presented herein to use in only a cellular communication system.

Overview

A current access network query protocol (ANQP) scheme assumes the network access node (e.g., AP) supports a single server for a client device to query to determine a set of service providers (e.g., 3GPP Cellular Network Information and Roaming Consortium Organization Identifiers). It does not account for a possibility of the network access node supporting a large number of service providers, and does not account for implementation of radio access network (RAN) sharing, i.e., where the network access node (which may conceptually be considered as a part of the RAN) can be coupled to a plurality of connectivity access network providers; each connectivity access network provider having characteristics that vary depending on the service providers to which it is coupled.

For RAN sharing, the RAN, and hence at least some of the network access nodes in the RAN, may connect to two or more serving networks, in which case the different serving networks may support, for example, different types of credentials for a client device to access. In this case, the client device may need to query the serving network and not the RAN to determine what types of access and services are supported.

Aspects described herein extend the current ANQP scheme to enable a network access node to support a larger number of service providers and a broader set of services than have heretofore been considered reasonable/practical. The aspects described herein may extend ANQP by, for example, implementation of at least three modes of queries, where the three modes of queries may be useful for ANQP and for other protocols relating to service queries.

A client device may use a serving network identifier as part of an enhanced query. The enhanced query may include one or more serving network identifiers. That is, the query may be directed to one or more serving network identifiers. The serving network identifier may be selected by the client device. Examples of serving network identifiers may include a service set identifier (SSID), a public land mobile network identifier (PLMN ID), a service provider identifier (SPI), and a network access identifier (NAI) realm. This list is exemplary and not limiting.

The selection of one or more serving network identifiers may permit the client device to direct the enhanced query to a specific server when RAN sharing is advertised. For ease of reference, the specific server may be referred to herein as a service query protocol server (SQP server). This may allow a network access node to be associated with multiple connectivity access network providers, each providing different services, features, and/or characteristics to the network access node.

For expository purposes, an extended or enhanced query protocol (e.g., an extended or enhanced ANQP) presented in the aspects described herein will be referred to as Service Query Protocol (SQP). However, it will be understood that any extension or enhancement of a protocol, such as ANQP used in WLAN, or a 3GPP querying protocol used in cellular LAN, can benefit from implementation of the aspects described herein. Therefore, for example, the aspects of methods and apparatus described herein are useful for all types of wireless and cellular LAN network access nodes, such as, without limitation, access points (APs) defined under IEEE 802.11, Wi-Fi, and/or Hotspot 2.0 as well as eNodeBs defined under 3GPP standards. For ease of reference, any type of wireless and/or cellular LAN access node may be referred to herein as a network access node.

A client device may use the multiple modes of SQP queries, such as those described herein, to receive a default list of connectivity access networks configured to enable access by client devices to service providers, receive a list of connectivity access networks configured to provide one or more services identified in an SQP query, and/or receive an indication from an access node as to whether credentials of a connectivity access network/service provider are available for use by the querying client device (despite the identity of the connectivity access network/service provider not being advertised by an access node).

A client device may discover: a default list of service providers available via an access node, one or more queried services and/or service providers, and whether service providers that are not advertised as being available at a given access node are in fact available at the given access node.

Operational Environment

Figure 2:
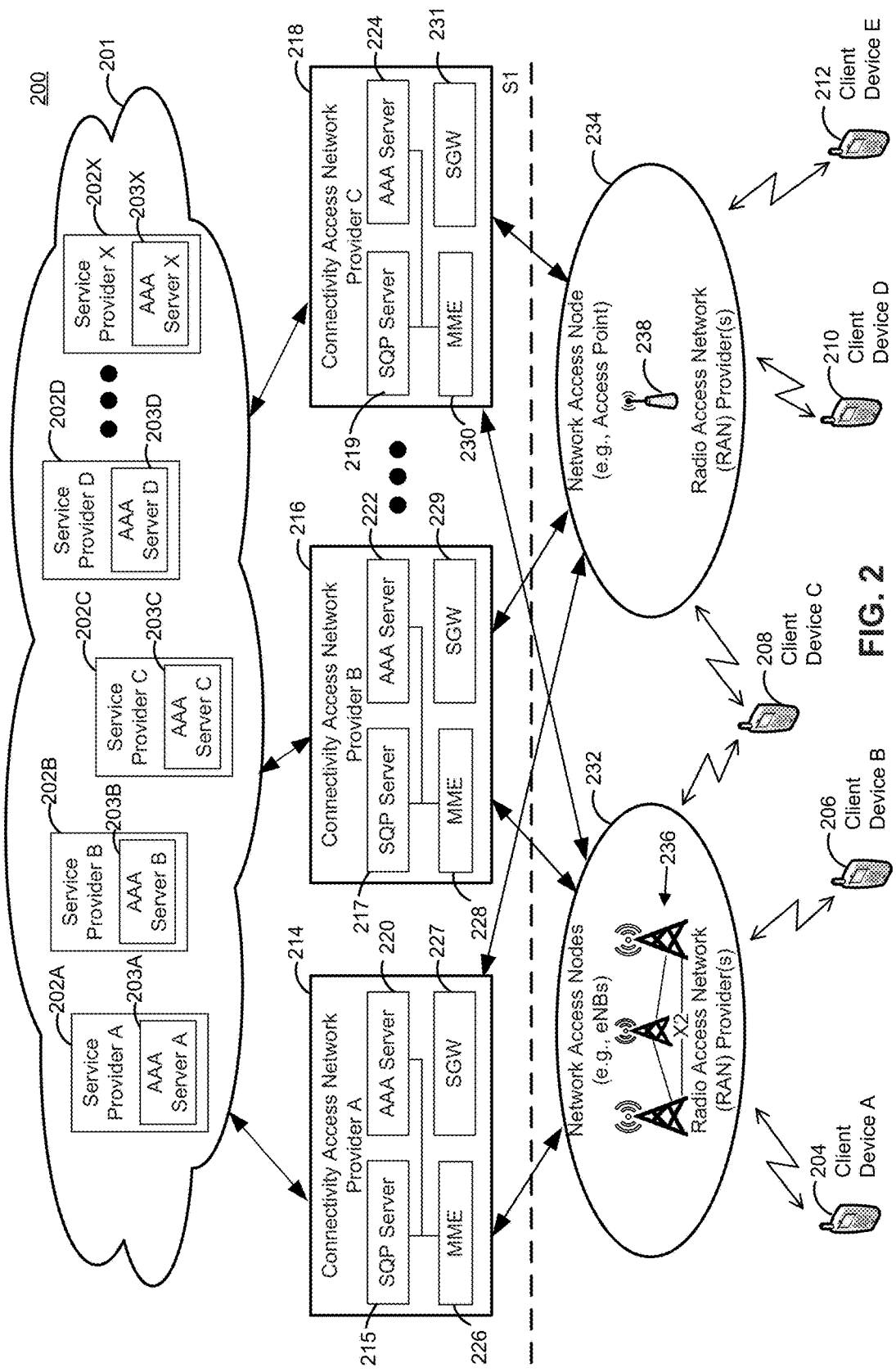
FIG. 2 illustrates a network architecture in accordance with an exemplary aspect described herein.

FIG. 1 illustrates a network architecture 100 according to the prior art. FIG. 2 illustrates a network architecture 200 in accordance with an exemplary aspect described herein. It will be understood that FIGS. 1 and 2 are simplified illustrations; many features well-known to those of ordinary skill in the art are omitted from FIGS. 1 and 2 to reduce clutter.

FIG. 1 illustrates a plurality of service providers 102A, 102B, 102C, 102D, ..., 102X (individually or collectively referred to herein as service provider 102). A service provider 102 is depicted as residing in a network 101, such as a packet data network (e.g., the Internet). Each service provider 102 may host credentials for various client devices 104, 106, 108, 110, 112. Credentials may be stored in authentication, authorization, and accounting (AAA) servers 103A, 103B, 103C, 103D, . . . , 103X (individually or collectively referred to herein as AAA server 103). Credentials may include credentials for service providers such as a social networking site service provider and/or a search engine site service provider. Each service provider 102 typically maintains billing relationships with connectivity access network providers 114, 116, 118.

Connectivity access network providers 114, 116, 118 (sometimes referred to as mobile network operators (MNOs)) may host sessions for client devices 104, 106, 108 to access services offered by service providers 102 (i.e., assuming the connectivity access network provider 114, 116, 118 has a relationship with the service provider 102 and the client device 104, 106, 108 has a subscription for the service). Connectivity access network providers 114, 116, 118 typically enforce subscription limits defined by the service providers 102. Connectivity access network providers may also be service providers as will be understood by those of skill in the art.

Each connectivity access network provider 114, 116, 118 may also include a respective AAA server 120, 122, 124. Each connectivity access network provider 114, 116, 118 may also include a respective mobility management entity (MME) 126, 128, 130. MMEs 126, 128, 130 and AAA servers 120, 122, 124 may be represented as protocol stacks comprised of multiple layers. Connectivity access network providers 114, 116, 118 may operate, for example, in accordance with 3GPP standards, such as LTE.

FIG. 1 further illustrates one or more radio access network (RAN) providers 132, 134. RAN provider 132 hosts access for one or more connectivity access network providers 114, 116, 118 via network access nodes 131 (e.g., evolved node Bs, eNodeBs, or eNBs). A practice of having a plurality of connectivity access network providers 114, 116, 118 share a RAN provider 132 may be referred to as RAN sharing. For ease of illustration, RAN provider 132 is depicted as operating a plurality of network access nodes 131 according to 3GPP standards. RAN sharing is defined in 3GPP standards; however, RAN sharing is not defined for IEEE 802.11 standards.

A RAN provider 134 may operate an access point (AP) 133 according to IEEE 802.11. At least because RAN sharing is not defined for IEEE 802.11, the RAN provider 134 communicates with one or more service providers directly, as opposed to via a connectivity access network provider.

Although only two RAN providers 132, 134 are illustrated in FIG. 1, it will be understood that a plurality of RAN providers may be present in any geographic area.

RAN providers 132, 134 may host access for client devices 104, 106, 108, 110, 112. A RAN provider 132 may enforce subscription limits that are defined by each of the plurality of connectivity access network providers 114, 116, 118, which may be, in turn, defined by the service providers 102. At least one of a plurality of connectivity access network providers 114, 116, 118 may be associated with a plurality of service providers 102. A RAN provider 134 may enforce subscription limits that are defined by the service providers 102. The service providers 102 may maintain billing relationships with network access nodes 131 (e.g., eNBs) of RAN provider 132 and the AP 133 (e.g., network access node) of RAN provider 134. Subscription limits may be, for example, limits on data usage and/or time.

The client devices 104, 106, 108, 110, 112 may host credentials for service providers 102 and connect to services via RAN providers 132, 134. Each client device 104, 106, 108, 110, 112 may store credentials in a respective memory circuit (not shown). Client devices 104, 106, 108, which access services via the RAN provider 132, determine what service provider and/or services to connect to via selection of one of a plurality of connectivity access network providers 114, 116, 118.

Client devices 108, 110, 112, which access network services via RAN provider 134, are limited in their ability to determine what network services to connect to, because each AP 133 is known in the prior art to be a single entity that is not defined to host services for a plurality of connectivity access network providers.

FIG. 2 illustrates a network architecture 200 in accordance with an exemplary aspect described herein. The exemplary network architecture 200 may be representative of a next generation (5G) network architecture; however, the aspects presented herein are not limited to the exemplary network architecture 200 of FIG. 2.

FIG. 2 illustrates a plurality of service providers 202A, 202B, 202C, 202D, . . . , 202X (individually or collectively referred to herein as service provider 202). A service provider 202 is depicted as residing in a network 201, such as a packet data network (e.g., the Internet). Each service provider 202 may host credentials for various client devices, such as client devices 204, 206, 208, 210, 212. Credentials may be stored in authentication, authorization, and accounting (AAA) servers 203A, 203B, 203C, 203D, . . . 203X (individually or collectively referred to herein as AAA server 203). Credentials may include credentials for service providers such as a social networking service provider and/or a search engine service provider. Each service provider 202 typically maintains billing relationships with connectivity access network providers 214, 216, 218.

Connectivity access network providers 214, 216, 218 (sometimes referred to as mobile network operators (MNOs)) may host sessions for client devices 204, 206, 208, 210, 212 to access services offered by service providers 202 (i.e., assuming the connectivity access network provider 214, 216, 218 has a relationship with the service provider 202 and the client device 204, 206, 208, 210, 212 has a subscription for the service). The connectivity access network providers 214, 216, 218 typically enforce subscription limits defined by the service providers 102. Connectivity access network providers may also be service providers as known to those of skill in the art. The connectivity access network providers 214, 216, 218 may operate, for example, in accordance with 3GPP standards and/or IEEE 802.11 standards.

Each connectivity access network provider 214, 216, 218 may also include a respective server, referred to for ease of identification herein as service query protocol server (SQP server) 215, 217, 219. SQP servers are described below. Each connectivity access network provider 214, 216, 218 may also include a respective AAA server 220, 222, 224. Each connectivity access network provider 214, 216, 218 may also include a respective mobility management entity (MME) 226, 228, 230. Each connectivity access network provider 214, 216, 218 may also include a respective serving gateway (SGW) 227, 229, 231. SQP servers 215, 217, 219, AAA servers 220, 222, 224, MMEs 226, 228, 230, and SGWs 227, 229, 231 may be represented as protocol stacks comprised of multiple layers. The typical operation and function of AAA servers, MMEs, and SGWs are known to those of skill in the art.

FIG. 2 further illustrates one or more RAN providers 232, 234. For ease of illustration, RAN provider 232 is depicted as operating a plurality of network access nodes 236 (e.g., eNBs) according to, for example, 3GPP standards, while RAN provider 234 is depicted as operating one network access node 238 (e.g., AP) according to, for example, IEEE standards. It will be understood that a RAN provider may operate any number of network access nodes according to any number of standards.

The aspects described herein facilitate RAN sharing between connectivity access network providers that host access nodes (e.g., such nodes may operate in accordance with one or more IEEE standards). In the exemplary aspect of FIG. 2, both of the first RAN provider 232 and the second RAN provider 234 may support RAN sharing in connection, for instance, with 3GPP standards and/or IEEE standards. In the exemplary aspect of FIG. 2, connectivity access network provider A 214, connectivity access network provider B 216, and connectivity access network provider C 218 share the first RAN provider 232 and the second RAN provider 234. However, it will be understood that aspects described herein are not limited to the RAN sharing scenario exemplified in FIG. 2; any combination of connectivity access network providers may share one or more RANs.

Although only two RAN providers 232, 234 are illustrated in FIG. 2, it will be understood that a plurality of RAN providers may be present in any geographic area. Additionally, it will be understood that APs can be collocated with eNBs.

RAN providers 232, 234 may host access for client devices 204, 206, 208, 210, 212. RAN providers 232, 234 may enforce subscription limits that are defined by the connectivity access network providers 214, 216, 218, which may be, in turn, defined by the service providers 202. Service providers 202 may maintain billing relationships with the network access nodes 236 of the first RAN provider 232 and the network access node 238 of second RAN provider 234. Subscription limits may be, for example, limits on data usage and/or time.

Client devices 204, 206, 208, 210, 212 may host credentials for service providers 202 and connect to services via the RAN providers 232, 234. Each client device 204, 206, 208, 210, 212 may store credentials in a respective memory circuit (not shown). Client devices 204, 206, 208, 210, 212 may determine which connectivity access network provider, service provider, and/or service to connect to via SQP queries sent to one of the plurality of connectivity access network providers 214, 216, 218 participating in RAN sharing of network access nodes 236, 238. In one aspect, the SQP queries may be forwarded, for example, to the SQP servers 215, 217, 219.

As used herein, a serving network may comprise one or more service providers 202, one or more connectivity access network providers 214, 216, 218, or a combination of at least one service provider and at least one connectivity access network provider. A serving network identifier may be used to identify a serving network.

Figure 3:
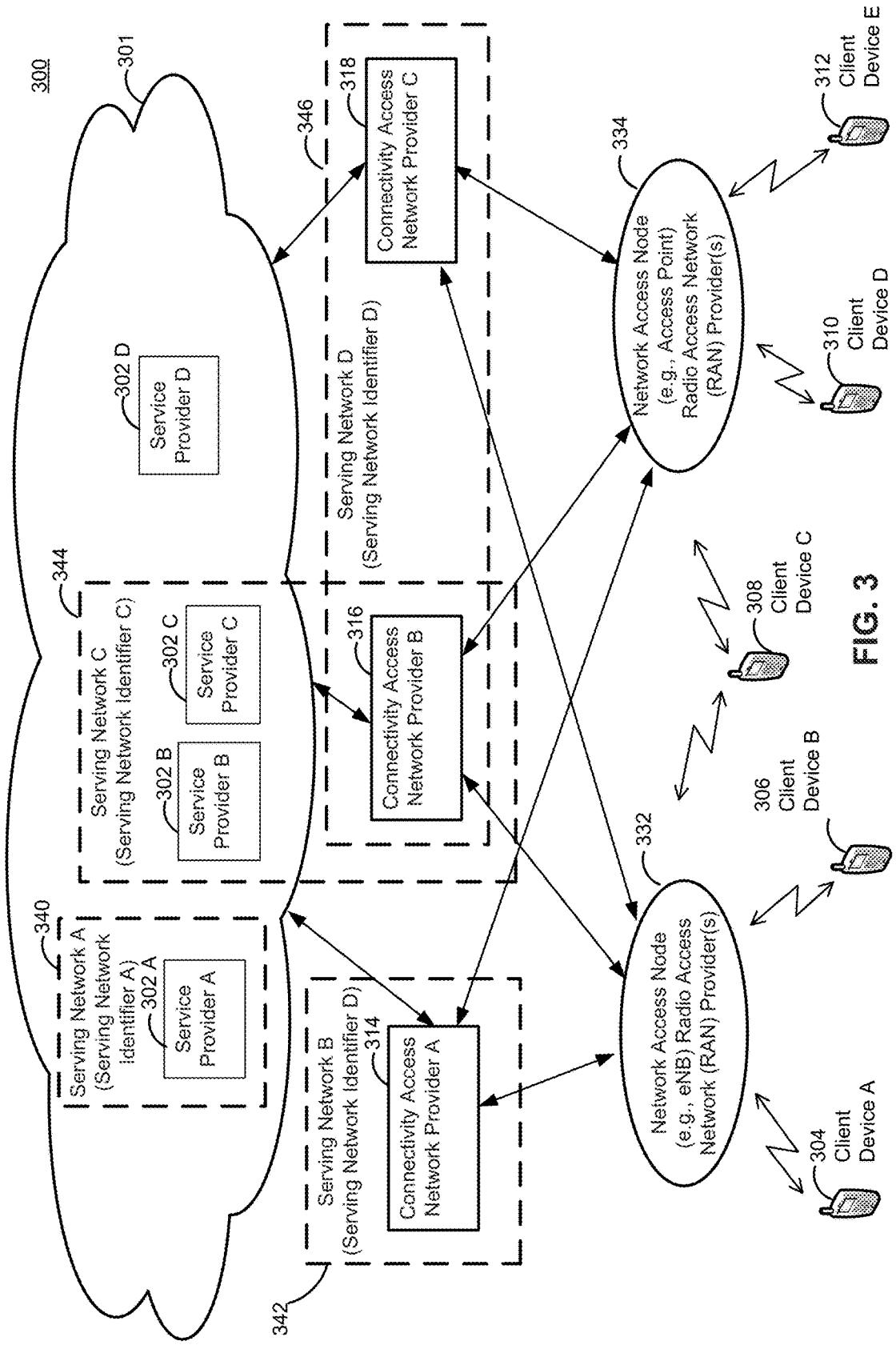
FIG. 3 illustrates another network architecture in accordance with an exemplary aspect described herein.

FIG. 3 illustrates another network architecture 300 in accordance with an exemplary aspect described herein. The network architecture 300 of FIG. 3 is similar to that of FIG. 2. Included in FIG. 3 are pluralities of service providers 302A, 302B, 302C, 302D (individually or collectively referred to herein as service provider 302). A service provider 302 is depicted as residing in a network 301, such as a packet data network (e.g., the Internet). Connectivity access network providers 314, 316, 318 (sometimes referred to as mobile network operators (MNOs)) may host sessions for client devices A-E (i.e., client devices 304, 306, 308, 310, 312) to access services offered by the service providers 302. FIG. 3 further illustrates first and second RAN providers 332, 334. First and second RAN providers 332, 334 may host access for the client devices 304, 306, 308, 310, 312.

FIG. 3 further illustrates four exemplary serving networks, each identified by a serving network identifier. Serving network A 340 includes service provider A 302A and is identified with a first serving network identifier (serving network identifier A). Serving network B 342 includes connectivity access network provider A 314 and is identified with a second serving network identifier (serving network identifier B). Serving network C 344 includes connectivity access network provider B 316, service provider B 302B, and service provider C 302C. Serving network C 344 is identified with a third serving network identifier (serving network identifier C). Serving network D 346 includes connectivity access network provider B 316 and connectivity access network provider C 318 and is identified with a fourth serving network identifier (serving network identifier D). As stated above, a serving network may comprise one or more service providers 302, one or more connectivity access network providers 314, 316, 318, or a combination of at least one service provider and at least one connectivity access network provider, accordingly many additional combinations are possible.

Elements of Information

As used herein, a service parameter may include one or more elements of information. In other words, the service parameter may be comprised of a set of elements of information. A service parameter may be, for example, a reference to a feature or aspect of a network or a service provider.

An element of information may describe, define, and/or relate to aspects of a network or entity (e.g., connectivity access network, a service provider) associated with a serving network identifier. Evaluation of one or more elements of information may facilitate selection of a serving network associated with the serving network identifier. In one aspect, an element of information may describe one or more network capabilities supported by a network associated with a first serving network identifier. Elements of information, may be stored in storage device (e.g., a memory circuit) of an SQP server. In one aspect, the value associated with any element of information may be set by the network.

An example of a service parameter may be "Interworking". The Interworking service parameter may include a plurality of elements of information. One example of an element of information related to the interworking service parameter may be "access network type" (e.g., free public network, chargeable public network, private network, private network with guest access, personal device network). Other examples of elements of information related to the interworking service parameter may include "venue group (e.g., business, educational, outdoor) and "venue type" (e.g., stadium, museum, restaurant, private residence). Each of the above-recited elements of information are included in the examples of elements of information 406, 408, 410 presented in FIG. 4.

FIG. 4 is a conceptual diagram of an exemplary table 400 that may be useful in connection with an explanation of aspects and features of elements of information as described herein. It will be understood that the data represented the table 400 of FIG. 4 may be stored in a multi-dimensional (e.g., n-dimensional where n 22) database in a memory circuit of an SQP server (e.g., 1800, FIG. 18). Moreover, it will be understood that the data represented in the table of FIG. 4 is exemplary and non-limiting. As depicted in the table of FIG. 4, elements of information 402 are presented in rows of the table 400 while values of parameters relevant to each network access node and service provider are presented in respective columns 404 of the table 400. Table 400 is limited by space to portrayal of network access nodes A-L of connectivity access network identifier (CAN ID) A, network access nodes A-N of CAN ID M, service provider A, service provider B, and service provider X, where A, L, M, N, and X are unrelated positive integers.

The cells in the columns of data associated with elements of information identified in rows identified with reference number 410 are left blank due to space constraints and also because those of skill in the art will understand types of information that would be recorded in these cells. For example, one of skill in the art would be able to understand that a "User friendly name and/or link to icon identifying CAN or SP" may refer to a generic name of an establishment (e.g., Mike's Hot Dogs) and understands the concept and use of links to icons. A basic service set identification (BSSID) may uniquely identify each basic service set (BSS). For example, in an infrastructure BSS, the BSSID is the MAC address of the wireless access point (WAP). The concept of MAC address is well understood by those of skill in the art. A service set identifier (SSID) may be up to 32 byte identifier of an extended service set (ESS) or independent basic service set (IBSS). The SSID can be used in multiple, possibly overlapping, BSSs. AAA server information may provide an identifier for contacting the AAA server, but may also comprise alternative information as known to those of skill in the art. Online signup (OSU) availability may be used to indicate whether a network access node of service provider offers the ability to sign-up for a feature or service online. OSU server information, similar to AAA server information may provide an identifier for contacting an OSU server, but may also comprise alternative information as known to those of skill in the art. Venue group may be exemplified by whether a group is related to business, educational, outdoor activities, etc. Venue type may be exemplified by whether a venue is a stadium, a museum, a private residence, a restaurant, etc. Network authentication types are well understood by those of skill in the art. Examples include Wi-Fi protected access (WPA and WPA2), wired equivalent privacy (WEP), 802.1X authentication, secure sockets layer (SSL), IP SEC, etc.). Network access identifier (NAI) Realm list/information may provide a NAI realms corresponding to SSPs or other entities whose networks or services are accessible via a network access node and other information such as a list of one or more extensible authentication protocol (EAP) method subfields, which that NAI realm uses for authentication may be set forth in the table 400. Third-generation cellular network availability information may contain cellular information such as network advertisement information e.g., network codes and country codes to assist a 3GPP non-AP STA in selecting an AP to access 3GPP networks as defined in Annex A of 3GPP TS 24.234. The emergency alert system message uniform resource identifier should be understood by those of skill in the art. Access node geospatial location is understood as coordinates in latitude-longitude. Access node civic location may be a street address. The table 400 may identify whether a given network access node or service provider gives Internet connectivity. In connection with interworking, the table 400 may indicate whether an access network requires an additional step required for access (ASRA) indicator. The table 400 may identify the type of access network (e.g., free public network, chargeable public network, private network with guest access, etc.). The table 400 may record identifiers of roaming consortium(s) whose networks are accessible via this network access node. It may identify IP address type (e.g., IPv6, IPv4). The table 400 may identify link status (e.g., whether the link is up, down, or in a test state). Among other things, the table 400 may identify whether the network access node is at capacity by indicating, for example, if no additional client devices will be permitted to associate to the network access node. Many other elements of information may be stored in the table 400 of FIG. 4. Moreover, it will be understood that the methods and apparatus exemplified by the aspects presented herein may make use of additional tables (not shown) for different modes; a mode may index a table. Furthermore, based on the type of elements of information included in a table, the information presented by the table may vary. For example, different information may be presented in each table and there may be separate tables indexed by service.

Each service provider and/or network access node may be selectively identified in a response to a request for a default list of service providers and/or network access nodes and may also be selectively identified as being hidden, so as to have the identifier of the service provider and/or network access node omitted from public broadcast (e.g., broadcast in a beacon signal). The first two rows 406 of the table 400 of FIG. 4 illustrate one way in which such identification may be accomplished. The indication of whether a given service provider and/or network access node is included in a default group or a hidden group may be represented with one or two flags. Using two flags, the first flag could identify inclusion in a default group and the second flag could identify inclusion in a hidden group. Because a service provider and/or network access node cannot be a part of both the default and hidden groups, the flags will typically be set for either the default or the hidden group, but not both. Accordingly, it may also be possible to use one flag, set to a first state to indicate inclusion in the default group and a second state to indicate inclusion in the hidden group. Other methods of indicating inclusion in a given group are acceptable within the aspects described herein. The values identified in the first two rows 406 of table 400 of FIG. 4 may be useful in connection with queries identified as belonging to the first mode of query, described in aspects presented herein. When a query is configured according to a first mode of a plurality of modes and when an element of information included with the query is a null-value, the first two rows 406 of table 400 of FIG. 4 may facilitate preparation of the response to the query (which may be referred to as the "default response" herein). Accordingly, the values (1 or 0) assigned to the cells of the first two rows 406 of table 400 of FIG. 4 may be used to identify the connectivity access networks and/or service providers that want/do not want to be included in the default response as well as those that want/do not want to hide their identities from network access node capability broadcasts.

As depicted in FIG. 4, the table 400 may identify services associated with each service provider and/or network access node of a connectivity access network (see, e.g., rows associated with reference number 408), where identifiers of network services are listed. For example, and for exemplary and non-limiting purposes only, network service identifier P may be used to indicate availability of a voice over IP service, network service identifier Q may be used to indicate availability of a voice over LTE service, network service identifier R may be used to indicate availability of a streaming video service, and network service identifier S may be used to indicate availability of a global positioning system (GPS) service. Other non-limiting exemplary services may include, for example, carrier aggregation and use of multiple input multiple output antenna service are within the scope of the described aspects.

Additional elements of information associated with the network access nodes and/or service providers (see, e.g., rows associated with reference number 410) may include, but not are not limited to: name, icon, and/or other type of identification of connectivity access network provider(s)/service provider(s) associated with the network access node; information related to an authentication, authorization, and accounting (AAA) server (e.g., AAA server of network access node, connectivity access network, and/or service provider); availability of online sign-up (OSU); and OSU server information; venues associated with the network access node (e.g., venue groups and/or venue types); network authentication types required by or available with the network access node (e.g., acceptance of terms and conditions, on-line enrolment supported, HTTP/S redirection, DNS redirection); network address identifier (NAI) realms information (e.g., identification of NAI realm(s) accessible through the network access node); information about third-generation mobile telephony cellular networks available through the network access node; emergency alert system (EAS) message uniform resource identifiers (URIs); and emergency calling instructions including, for example, telephone numbers, and the geospatial and civic locations of the network access node; network code; country code; Internet connectivity (e.g., availability); network access node and/or connectivity access network type (e.g., free public network, chargeable public network, private network with guest access, personal device network, etc.), identifier(s) of roaming consortium(s) whose networks are accessible via the network access node; IP address type (e.g., IPv6, IPv4); link status (e.g., link up, link down, link in test state); at capacity (e.g., set to 1 if no additional client devices will be permitted to associate to the network access node); downlink (DL) speed (e.g., backhaul link downlink speed in kbps); and uplink (UL) speed (e.g., backhaul link uplink speed in kbps). Elements of information may additionally or alternatively include, but are not limited to, over-the-air information elements (IEs) that may typically be associated with IEEE standards such as: basic service set identification (BSSID) and service set identifiers (SSIDs). Although some or all of the name provided for the elements of information may be the same or similar to names of information elements defined for IEEE ANQP, the identity or similarity is coincidental and not intended to limit any definition or use of any elements of information described herein.

The element of information may be identified in a query by a set of characters that includes a wildcard character. Multiple wildcard characters are also acceptable. In accordance with one aspect, a wildcard character may represent any of the characters in the set of characters. Accordingly, a query using one or more wildcard characters may desirably cause the query to include a plurality of results. As will be understood, a wildcard character may serve as a substitute for any other character in a string. For example, a search including an element of information such as "voice over *" (where * represents a wildcard character) may return results relevant to "voice over IP" and "voice over LTE" for example.

Service Query Protocol (SQP)

In accordance with aspects described herein, a protocol, referred to herein as a Service Query Protocol (SQP) may be defined to enable a client device (e.g., a UE, a STA, a terminal) to discover information related to a network access node (e.g., an AP, an eNB) and/or a serving network of the network access node. In some aspects, SQP may enable a device to discover the service providers and other service information for the serving networks of a network access node. As used herein, the serving network of a network access node may include all connectivity access network providers/service providers that are associated with, or share, the network access node. SQP may be useful in all operational environments, but may be particularly useful in environments where the serving network includes a plurality of connectivity access network providers, each hosting one or more services/service providers.

SQP may have several characteristics. A first characteristic may be that an SQP query need only be run once in connection with each connectivity access network (up to a validity time). In other words, the information associated with an SQP query may not be valid indefinitely. The information may be associated with an expiry time. That is, it may be defined as being valid up to a certain time, which could be absolute (e.g., valid until Monday at 9 pm) or relative (e.g., valid for the next 3 hours). Each connectivity access network may be identified by a connectivity access network identifier (CAN ID). Examples of CAN ID may include, for example, service set identifier (SSID), public land mobile network identifier (PLMN ID), service provider identifier (SPI), and network access identifier (NAI) realm type identifier. The SQP query may only need to be run once to determine, for example, if the client device has a valid subscription associated with a given connectivity access network, or to provision a new subscription at a new/unrecognized connectivity access network. The characteristic that SQP queries need only be run once in connection with each connectivity access network may be evident when considering, for example, a first SQP query made at a first network access node. At the first network access node, if the device sends an SQP query to determine the services associated with a given CAN ID associated with the first network access node, then the client device can assume that the same services are available at all other network access nodes associated with the same CAN ID, up to some granularity. The concept of granularity, as described in this aspect, may be exemplified using tracking area (TA). As known to those of skill in the art, a tracking area may define one or more eNBs. Thus, granularity in this context may imply a geographic area. Nothing herein is intended to limit the concept of granularity to this example. Any identifier or acronym, popular now or in the future, may be used instead of TA to identify eNBs from which the same services are available. Alternatively, a list of eNBs, from which the same services are available, could be provided in a response to an SQP query.

A second characteristic may be that the SQP may also include support for subscription identification. For example, in response to an SQP query requesting subscription identification, a response indicative of the existence of a valid subscription could be received at a device. The response may include, for example, a name and/or an icon that could be displayed on a screen of the client device. The name and/or icon could be used to identify a RAN provider, connectivity access network provider, and/or service provider to which the device would couple.

Additionally, SQP may provide a client device with information on types of provisioning available to the device. For example, a client device could be able to use SQP to sign-up for a new service on an already subscribed-to connectivity access network. Additionally or alternatively, the device may provision a new subscription at a new or unrecognized connectivity access network. Such provisioning may be referred to as online signup (OSU).

A third characteristic may be that SQP may be implemented in, or made operational over, an unauthenticated non-access stratum (NAS) or radio resource control (RRC) connection. Accordingly, if a client device does not have a subscription for a connectivity access network identified by a particular CAN ID, the client device can nevertheless use SQP to determine what services are available from the connectivity access network without having to first attach to the connectivity access network. If the client device determines that it does not have a subscription, but seeks to obtain services offered through the connectivity access network identified by the particular CAN ID, then the client device can acquire a subscription through, for example, OSU as described above.

A fourth characteristic may be that SQP may be used to obtain information related to a network access node by a client device instead of, or in addition to, obtaining information about the network access node from beacons or broadcasts sent from the network access node (e.g., system information blocks (SIBs) broadcast by the network access node). The information obtained may be related to service parameters in general or to elements of information that may be aspects of, or components of, the service parameters.

The information obtained in response to an SQP query may be useful to the client device at least because the client device determined a need to query the network access node for the information. In other words, unlike an unrequested SIB, which may contain information not needed by the client device, a response to an SQP query would typically include only information needed by the client device (given that it was the client device that formulated the SQP query and therefore presumably needed the information).

The fourth characteristic may make it easier to extend support to future requirements and services. For example, in both cellular LAN (e.g., 3GPP LTE) and WLAN (e.g., IEEE 802.11), a network access node typically broadcasts basic information about the network(s) supported by the network access node (e.g., using beacons such as SIBs). To broadcast any more information would be an inefficient use of resources, including resources of bandwidth, time, and energy. However, by using SQP, a great deal of information can be provided from the network access node to the client device—but only to the client device that requested that information and only that information that the client device determined was needed.

Each network (for example, MME for NAS and eNB for RRC) may be configured with one or more service providers and/or MNOs that provide access via the network. For each service provider/MNO, information about how to obtain access is configured or available (e.g., via DNS lookup, etc.):

Service provider:
Service provider identification (e.g., name, icon);
Type of authentication;
AAA Server information; and
Availability of online sign-up (OSU), and OSU server information.

This information may be available to the client device via SQP query/response.

SQP data, such as service parameters and elements of information related to the service parameters may be stored in memory devices associated with SQP servers.

Exemplary Modes of SQP Queries

As indicated above, subsequent to making the determination of a need to obtain a service parameter from a network access node, the client device may select an element of information related to the service parameter. The element of information may become a basis for, or a part of, an SQP query to be sent to the access node. The SQP query may be derived at the client device. The derived SQP query may be configured according to one of a plurality of modes. Three exemplary modes of SQP query are described herein. It will be understood that each of the three exemplary modes is formatted to include at least one of what is referred to herein as an "element of information." However, it will be understood that other formats are equally acceptable. Additionally, it will be understood that some SQP queries may be formatted as commands.

As indicated above, in order to scale to support a larger number of service providers, a broad set of services, and multiple modes of operation, a new query protocol, the Service Query Protocol (SQP), may be introduced. Existing protocols may permit a client device to query an AP to determine, for example, a type of the connectivity access network. For example, in IEEE 802.11u, a client device may send a query to an AP to request an "Interworking" information element (IE). The AP may respond with an Access Network Options field, which identifies: the "Access Network Type" (e.g. free public network, chargeable public network, private network, private network with guest access, personal device network, etc.); an Internet field (e.g., to indicate if the network provides Internet connectivity); an "Additional Step Required for Access" (ASRA) field (e.g., to indicate if the network requires more steps to gain access); other fields related to emergency services, and still other optional fields that will not be described.

Not all of the information in the above described response may be needed by the client device; however, due to a relatively low volume, the unneeded information is easily discarded and the additional filtering time, energy, and bandwidth used to collect, code, send, decode, and process the unneeded information may be considered negligible.

At some time, an AP may support a plurality of connectivity access network providers—not only one. As used herein, this aspect may be referred to as RAN sharing. At such a time, if the beacon broadcast from the AP (e.g., similar to an SIB) advertised only six connectivity access network providers (as suggested above based on current limitations on SIB1 beacons), a client device needing all or some information related to Interworking may be needed to send one ANQP query each to the six connectivity access network providers identified in the beacon. This would result in six times as much information being returned to the client device as in the previous example. Still further, if, as suggested above, an even a greater number of connectivity access network providers shared the AP (by way of, for example, implementation of some aspect similar to 3GPP RAN sharing) and if the client device was able to send queries to each of this greater number of connectivity access network providers, then the amount of data coming back to the client device could become unreasonably voluminous. The resources in terms of time, energy, and bandwidth used to collect, code, send, decode, and process the unneeded information may no longer be considered negligible. The resources might be better spent on other tasks.

However, by introducing SQP, the aspects describe herein can be used to formulate SQP queries that achieve targeted results in comparison to, for example ANQP. Use of SQP queries therefore may reduce the volume of a response to a query sent to a network access node concerning one or a plurality of connectivity access network providers/service providers. Use of SQP queries may therefore help focus the information received in a response to a query to that which is pertinent to the client device sending the query. To accomplish this, three modes of SQP query may be introduced. It will be understood that the number of modes is not limited to three; a fewer or greater number of modes is acceptable and in accordance with aspects described herein.

In response to each of the exemplary three modes of SQP query, instead of obtaining voluminous and often unneeded information associated with a serving network of a given access node, each SQP query may result in the return of a selective list of connectivity access network providers, service providers, and/or services determined in response to the mode of the SQP query.

By way of example, a network access node may be shared by ten connectivity access network providers, which may collectively represent one hundred service providers. Instead of sending an ANQP-type query requesting an Interworking information element (IE) to each of the one hundred service providers, and obtaining one hundred responses each giving information related to the Access Network Type, Internet Connectivity, ASRA, and other fields related to emergency services, a response in accordance with exemplary aspects of SQP described herein could return one list of connectivity access networks or service providers that provide the element of information identified in the SQP query (according to the mode of the SQP query). Thus, if the element of information sent in an SQP query according to a second mode described herein was a query for "Private Networks with guest access" and if only eight of the one hundred service providers accessible through the access node offered this feature, then the response to the query would be a list of the eight identifiers of the service providers that provide the specifically sought service. The client device would then only need to select from among the eight service providers. The client device might further limit the selection, for example, by selecting from among only those service providers with which the client device has a subscription.

In accordance with exemplary aspects, an "element of information" included in a query may include more than one parameter. In one example, an element of information might be described or defined as the phrase "private networks with guest access and download speed less than a given value." In accordance with this example a returned list might include only one or two service provider identifiers (depending, perhaps in this case, on the value of the desired downlink speed).

Accordingly, an ANQP-type query may be understood to be a request for all information associated with a given information element (IE), such as the "WAN Metrics IE" defined for Hotspot 2.0, an example of which is shown below:
WAN info:
    Link Status: [Link Up, Link down, Link in Test State]
    Symmetric Link: Set to 1 if UL and DL speed is the same
    At Capacity: Set to 1 if no additional mobile devices will be permitted to associate to the AP
    DL Speed: Estimate of the WAN backhaul link current downlink speed in kbps
    UL Speed: Estimate of the WAN backhaul link current uplink speed in kbps
    DL Load: Current percentage of loading of the DL WLAN access as measured over an interval the duration of which is reported in Load Measurement Duration (0 if unknown)
    UL Load: Current percentage of loading of the UL WLAN access as measured over an interval the duration of which is reported in Load Measurement Duration (0 if unknown)
    LMD (Load Measurement Duration): Duration over which the DL Load and UL Load have been measured in tenths of a second.

In contrast, and by way of example only, a query according to the second mode of SQP queries described herein can result in the return of a concise list of service providers supported by the access node that have, for example "a DL Speed greater than X and an UL speed greater than Y." As another example, consider an SQP query according to the second mode of SQP queries described herein, where the element of information included in the SQP query is, for example, video streaming capability. Such a query may receive a response listing only those service providers associated with the access node that support video streaming. Accordingly, a client device would not need to search through a large number of responses from the entire set of service providers supported by a given access node to determine which of the large number of service providers offered video streaming. In the example, the client device would receive one list that included the identities of a subset of service providers supported by the given access node that offer video streaming. The client device might then select, for connection, a service provider with which the client device has a subscription agreement.

The following paragraphs provide additional information concerning the exemplary first, second, and third modes of SQP queries.

An exemplary first mode of SQP query may return a default list of service provider identifier(s)/connectivity access network identifier(s). A query in accordance with the first mode may be referred to as a Default Service Provider Identifier/Connectivity Access Network Identifier (SP ID/CAN ID) Query. The identified service provider(s) and connectivity access network(s) may be configured to enable network access to the client device that sent the SQP query. In some aspects, no element of information relating to the service providers or connectivity access networks is included in the SQP query. For example, a query composed as a first mode of SQP query may include as its element of information a null-value, an empty string, a zero value, or any one or more pre-determined characters.

An SQP query sent from a client device in accordance with the first mode may cause the access node to return a default response. The default response could be a listing of all or a subset of all identifiers of those connectivity access networks/service providers sharing the network access node. Other default responses may be within the scope of the aspects described herein.

In accordance with an aspect of the first mode of SQP query, each connectivity access network and/or service provider may be configured at an SQP server with a flag to indicate whether or not to include its identifier in a response to a Default Service Provider Identifier/Connectivity Access Network Identifier (SP ID/CAN ID) SQP query. A connectivity access network/service provider could be included in the listing by agreeing to be identified on the list of default connectivity access network(s)/service provider(s). A connectivity access network/service provider could be excluded from the listing of default connectivity access network/service provider by, for example, requesting to be omitted from the default list. In some aspects, a third party may exercise control over which connectivity access network/service provider are permitted to be on the default list.

In accordance with an aspect of the second query mode, one or more service-specific elements of information may be included in the query. A query in accordance with the second mode may be referred to as a Service Specific SP ID/CAN ID Query. The exemplary second query mode may return a list of the connectivity access networks/service providers configured to provide the one or more services, where the one or more services were identified as elements of information in the SQP query. Additionally, the list may identify services or devices supported by each connectivity access network/service provider on the list. Note that in some cases a service may be associated with a device, e.g., a service branded client device such as a tablet provided, or sponsored, by a social media service provider.

In accordance with an aspect of the second query mode, each connectivity access network or service provider may be configured at the SQP server with a list of supported services, for example, a list of services that provide sponsored connectivity, and a list of supported devices.

According to an aspect of the second mode of the plurality of modes, the element of information may be an identifier of a service, and the query sent in accordance with the second mode may cause the network access node to return a set of identifiers of connectivity access network/service providers that support the service. The identifier of the service may be a more or less generic name, such as "streaming service" or may be a predetermined identifier.

In some aspects a query composed as the second mode type of SQP query may include, as its element of information, an identifier of a connectivity network access/service provider. A query according to this aspect of the second mode may cause the access node to return a list of services supported by the identified connectivity access network/service provider.

In some aspects, the returned set of identifiers of connectivity access networks/service providers that support the service may include a list of additional services, if any, supported by each of the connectivity access networks/service providers in the returned set.

Additionally or alternatively, in some aspects, the returned set of identifiers of connectivity access networks/service providers may include, for at least one of the connectivity access network/service providers, a list of client devices supported by the connectivity access network/service provider.

In accordance with an aspect of the third query mode, a service provider identifier (SP ID) may be included as an element of information in the SQP query. A query in accordance with the third mode may be referred to as a Service Provider Query. The third query mode may be a mode used to determine if the connectivity access network is associated with a service provider identified by the SP ID.

The exemplary third query mode may return an indication as to whether the service provider credentials are available for use by the client device.

The exemplary third query mode may be intended for scenarios where the service provider is not advertised as being available. For example, a service provider may be associated with a network, yet choose to remain hidden (similar to a hidden mode for WLAN APs). In some aspects, the SQP server may be configured to support a flag to support hiding of service provider identifiers. The flag may be set if the service provider does not want its availability publically advertised.

According to the exemplary third mode of the plurality of modes, the element of information may be an identifier of a connectivity access network/service provider, and the query sent in accordance with the third mode may cause the access node to return an indication of an availability of the credentials of the connectivity access network/service provider for use by the client device (e.g., the network access node may return an indication that the credentials of the connectivity access network/service provider are available to the client device).

The preceding aspect may be useful when the connectivity access network/service provider is not identified to the client device in, for example, an over-the-air message broadcast advertising the connectivity access network/service providers that are hosted by (or available through) the network access node. Such an advertisement may be sent as an unauthenticated message from the network access node before the client device attaches to the access node. In this way, the client device can communicate with the access node without having to commit to a network. However, such an advertisement could be made in any broadcast received from the access node at the client device. This third mode may be useful for client devices that seek to establish operational communications with a connectivity access network/service provider that did not want to be included in a default list of providers advertised by the network access node. An example of such a provider may be one involved with a closed subscriber group (CSG), where only subscribes to the CSG are allowed to access the CSG.

A query composed according to the third mode of query may include as its element of information an identifier of a connectivity access network/service provider. In contrast to the second mode SQP query, the third mode may cause the network access node to return an indication of an availability of the credentials of the identified connectivity access network/service provider. This aspect may be useful when the connectivity access network/service provider is not identified to the client device in, for example, a broadcast advertisement of the connectivity access networks/service providers that are hosted by (or available through) the network access node. Such an advertisement may be an over-the-air message broadcast. However, such an advertisement could be made in any broadcast received from the network access node at the client device. This third mode may be useful for client devices that seek to establish operational communications with a connectivity access network/service provider that did not want to be included in the default list of such providers advertised by the network access node. An example of such a provider may be one involved with a closed subscriber group (CSG), where only subscribes to the CSG are allowed to access the CSG.

While three modes of query were described above, nothing herein is meant to limit any aspect to these three modes of query. A fewer or greater number of modes of query are acceptable.

Connectivity Access Network Identifier (CAN ID)

In the aspects described herein, the term connectivity access network identifier (CAN ID) may have several characteristics. A first characteristic may be that the CAN ID may be broadcast over-the-air. That is, a client device may not need to attach to a network access node to identify a connectivity access network sharing the network access node. Nor must the client device send a probe request to retrieve the CAN ID in a probe response. However, the uses of probe requests/responses are within the scope of the aspects described herein.

A second characteristic of the CAN ID may be that it may indicate an operator of the connectivity access network and/or the network access node (e.g., eNB).

A third characteristic may be that the CAN ID may either implicitly indicate a deployment model based on the type of network identifier, (e.g. a public land mobile network (PLMN) ID type identifier may indicate a traditional, or cellular, network operator (e.g., a 3GPP LTE network operator that, for example, implements RAN sharing), whereas a different type of identifier may indicate a network that is not associated with a PLMN ID (e.g., a non-traditional, IEEE 802.11 or Hotspot 2.0 network operator, that, for example, may also implement RAN sharing), or the CAN ID may explicitly contain an indication of the deployment model type of network.

A network access node in a RAN may support more than one CAN ID. Support of multiple CAN IDs may be used to implement RAN sharing on IEEE 802.11, Hotspot 2.0, and other types of systems that heretofore were not known to support RAN sharing. A second reason may be to support different types of identifiers on a network access node; for example, a given network access node might advertise both a public ID and a private ID. A private ID might be useful, for example, for an individual that wishes to connect client devices in his or her home to a network that is not accessed by others. The public ID might be useful for the same individual that wishes to provide Internet access to guests. The separate CAN IDs for private and public networks associated with one network access node may permit the use of separate SQP servers for each connectivity access network or the aspects of the serving network associated with a given network access node. Separate SQP servers may be useful, as a user may wish to make more services available on the private network than on the public network.

A network access node (e.g., eNB, AP) should be able to support serving network identifiers for private and public use, as well as for RAN sharing. For example, a network access node should be able to advertise multiple access networks, as for RAN sharing, but also may be able to advertise a secondary ID, similar to a closed subscriber group ID (CSG ID), to indicate a private access network that is also part of a public access network.

Each CAN ID may be associated with a separate SQP server. In this way, a network access node could provide a first set of services from a first service provider via a first CAN ID and a second set of services from a second service provider via a second CAN ID, where both CAN IDs might be broadcast, or obtained via probe request/response, from the network access node.

A network access node (e.g., eNB, AP) may not be required to be associated with a PLMN in order to support non-operator deployments. For example, the network access node may advertise an alternative ID to identify an access network provider. This alternative ID may be similar to a service set identifier (SSID) in that it is not a managed ID and so may not be unique to the access network.

Transport of SQP queries, such as the above identified SQP queries that may be configured according to one of a plurality of modes, will now be described. Such SQP queries may be useable by various types of networks. Generally, SQP queries may be transported in the control plane using NAS transport or RRC transport.

Network Architectures Incorporating SQP

According to aspects described herein, each network access node (e.g., eNB/AP) may be associated with one or more connectivity access networks (e.g., mobile network operators (MNOs)). Each connectivity access network may be configured with one or more service providers. Access by a client device to the service providers may be obtained via a network access node. For each connectivity access network/service provider, information about how to obtain access may be configured, or is available (e.g., via a domain name system (DNS) lookup, etc.), to the client device. The connectivity access network/service provider information may include, for example: CAN ID/SP ID identification (e.g., name, icon): type of authentication; authentication, authorization, and accounting (AAA) server; availability of online signup (OSU); and/or OSU server information. This information may be available to a client device via SQP query/response.

Figure 5:
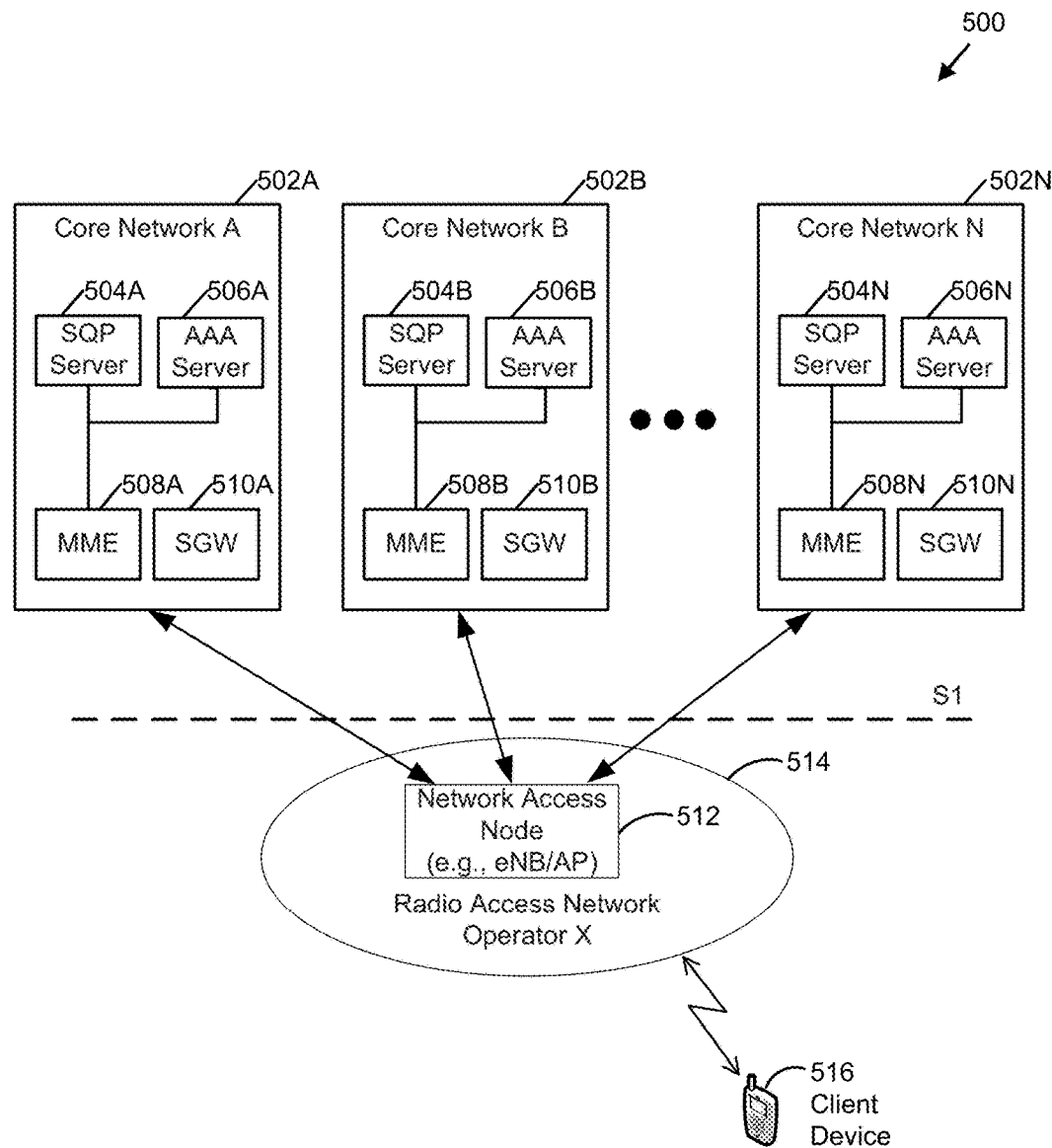
FIG. 5 illustrates a first network architecture that facilitates use of a service query protocol.
Figure 6:
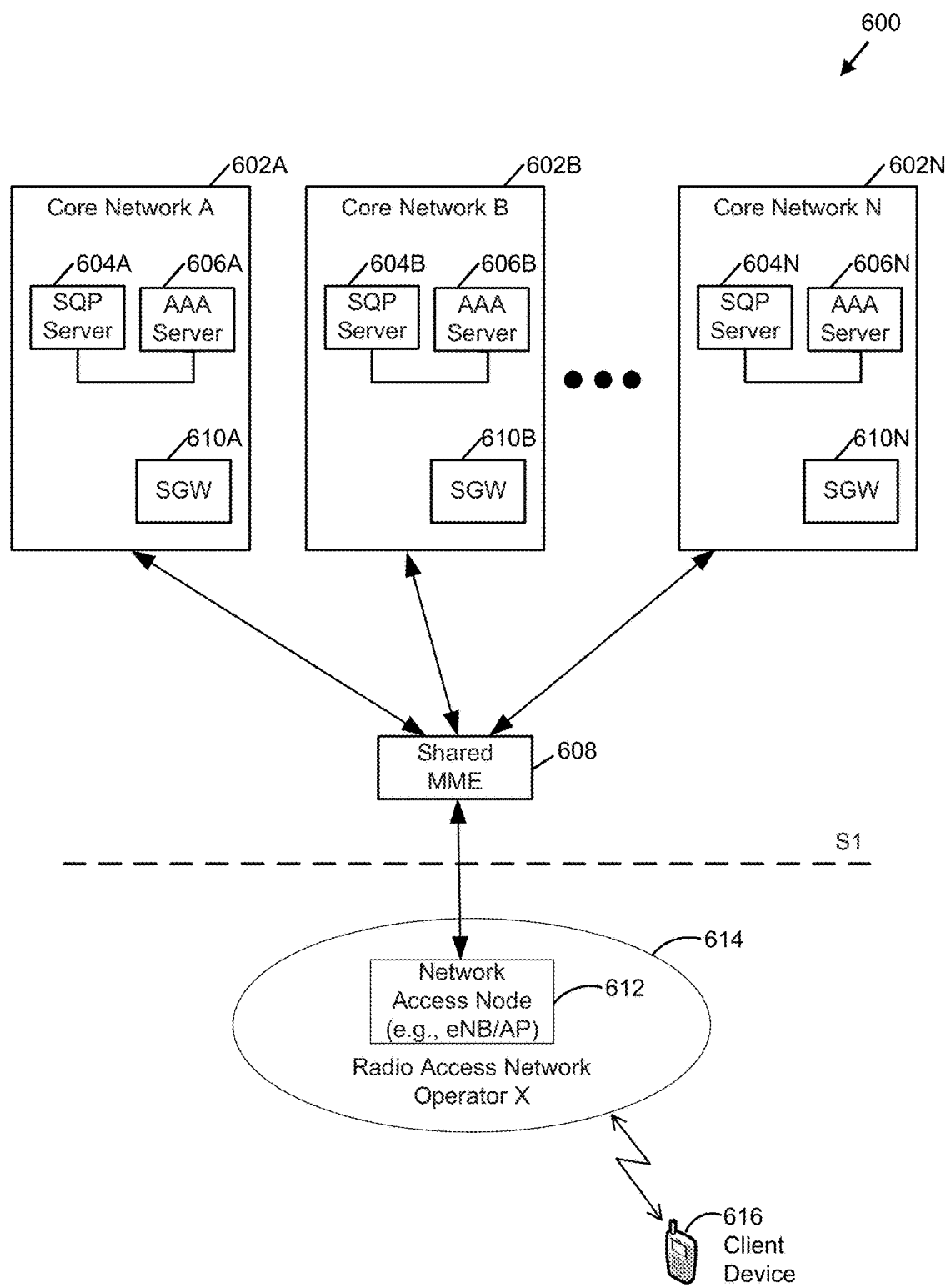
FIG. 6 illustrates a second network architecture that facilitates use of the service query protocol.
Figure 7:
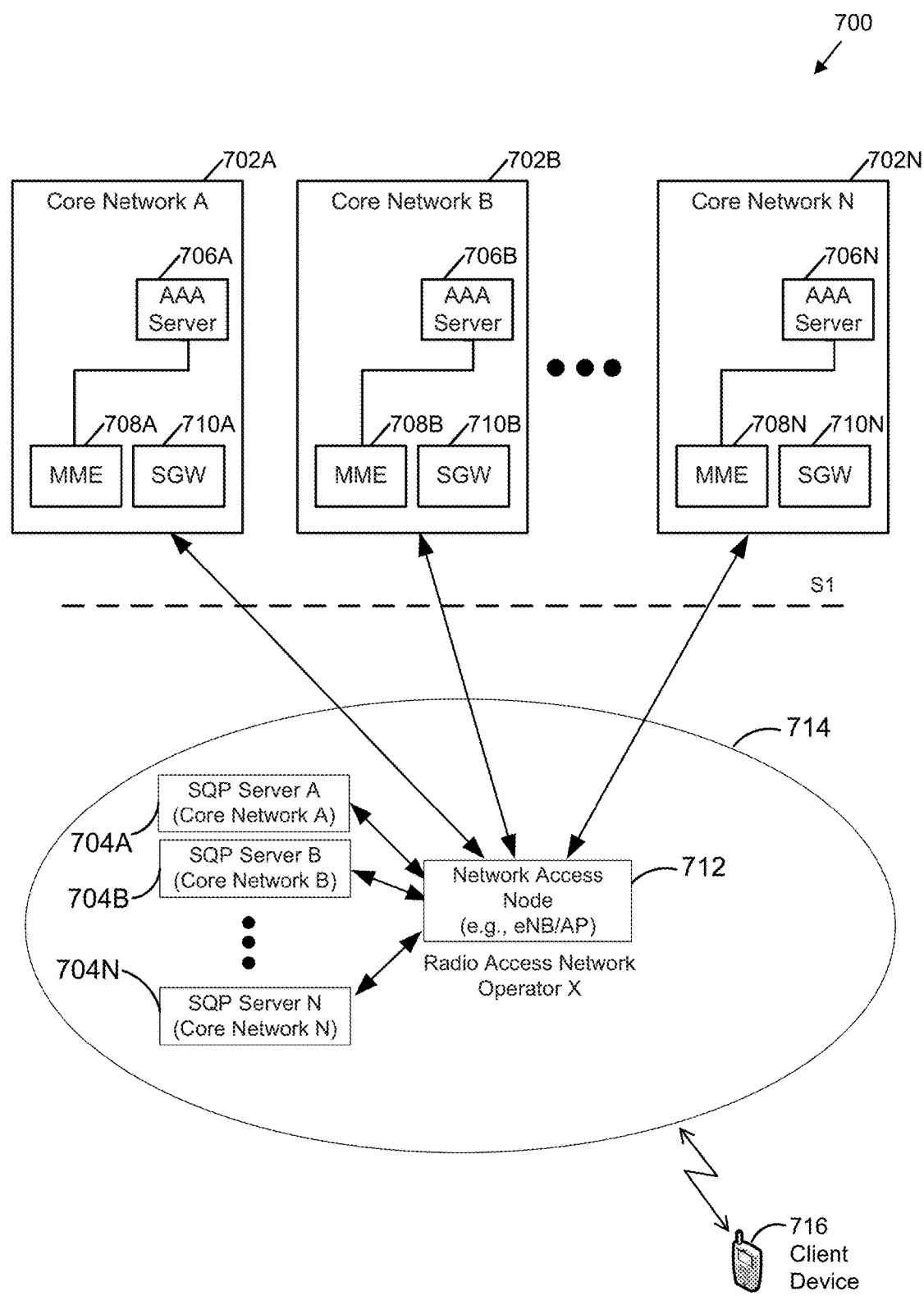
FIG. 7 illustrates a third network architecture that facilitates use of the service query protocol.

FIGS. 5, 6, and 7 illustrate first, second, and third aspects of network architectures in accordance with exemplary aspects described herein. Nothing, however, restricts a possibility of additional/alternative aspects of network architecture. For ease of illustration, a connectivity access network provider and its service providers are represented in combined form and identified by blocks labeled Core Network A, Core Network B, . . . , Core Network N, where N is a positive integer.

The exemplary aspects may find applicability in next generation (5G) network architectures but are not limited thereto. The exemplary aspects may be useful for a client device to determine available wireless network services/service providers using SQP queries. FIG. 5 illustrates a first network architecture, which may be referred to as GWCN architecture 500, which facilitates use of a service query protocol. FIG. 6 illustrates a second network architecture, which may be referred to as MOCN architecture 600, which facilitates use of the service query protocol. FIG. 7 illustrates a third network architecture, which may be referred to as a second core network architecture 700, which facilitates use of the service query protocol. The network architectures of FIG. 5, FIG. 6, and FIG. 7 enable incorporation of SQP for all types of network access nodes (e.g., 3GPP LTE eNBs, IEEE 802.11 APs). The terminology used herein is exemplary and not intended to be limiting. For example, use of the term mobility management entity (MME) is not meant to limit the scope to network architectures that use entities so named. The same or similar functionalities of MMEs illustrated in FIGS. 5, 6, and 7 may be implemented in other networks under one or more different names. Use of differently named entities, which perform the same or similar functionalities as, for example, the MMEs illustrated in FIGS. 5, 6, and 7, are also contemplated herein. Additionally, it will be understood that several components of a typical communication system are omitted from FIGS. 5, 6, and 7 to avoid cluttering the drawings.

Each of FIG. 5, FIG. 6, and FIG. 7 includes at least one MME and serving gateway (SGW). For conciseness, the MME and SGW are described in connection with FIG. 5, so as to avoid repeating the same or similar descriptions in connection with FIG. 6 and FIG. 7.

FIG. 5 relates to an exemplary aspect referred to herein as a Gateway Core Network (GWCN) architecture 500 for network sharing. Each core network 502A, 502B, . . . , 502N includes its own SQP server 504A, 504B, . . . , 504N. As illustrated, each core network 502A, 502B, . . . , 502N also includes its own AAA server 506A, 506B, . . . , 506N, MME 508A, 508B, 508N, and SGW 510A, 510B, . . . , 510N.

According to the first example of network architecture, each of the AAA servers 506A, 506B, . . . , 506N may be thought of as a circuit/function/module that may service requests from client devices for access to computer resources and may provide authentication, authorization, and accounting services. Aspects of authentication, authorization, and accounting services are understood by those of skill in the art. A AAA server 506A, 506B, . . . , 506N may typically interact with network access and gateway servers and with databases and directories containing user information. Each of the MME 508A, 508B, . . . , 508N may be responsible for tracking and paging procedures including retransmissions, and also for the idle mode of a client device (e.g., client device 520). Each of the MME 508A, 508B, . . . , 508N may also be involved in bearer activation and deactivation procedures. Each of the MME 508A, 508B, . . . , 508N may also be responsible for client device authorization to public land mobile networks (PLMNs) and enforcing client device roaming restrictions, if any. Each SGW 510A, 510B, . . . , 510N is a gateway. Each client device (e.g., client device 516) may be associated with a one SGW 510A, 510B, . . . , 510N at one time. Each SGW 510A, 510B, . . . , 510N may be responsible for handovers with neighboring network access nodes. Each SGW 510A, 510B, . . . , 510N also may maintain context information related to a client device (e.g., 516) when the client device is in an idle state.

FIG. 5 illustrates a network access node 512 (e.g., eNB/AP) coupled to N core networks 502A, 502B, . . . , 502N in accordance with aspects described herein. Although only one network access node 512 is illustrated in the RAN 514, it will be understood that the RAN 514 may include a plurality of network access nodes. The network access node 512 may be identified by a unique identifier. The S1 interface, between the Evolved UMTS Terrestrial Radio Access Network (EUTRAN) and the Evolved Packet Core (EPC), is depicted as a dashed line between the RAN 514 and each of the core networks 502A, 502B, . . . , 502N. Again, usage of terminology associated with a given communication standard is not intended to limit the scope to that particular communication standard.

FIG. 5 relates to utilization of an SQP server in communication with a non-access stratum (NAS) layer of a protocol stack. A description of an exemplary protocol stack is provided herein.

In accordance with GWCN architecture 500, in the aspects described herein, a client device 516 may identify an intended destination of an SQP query message to the network access node 512 by use of the destination's serving network identifier. A serving network identifier may be, for example, a service set identifier (SSID), a public land mobile network identifier (PLMN ID), a service provider identifier (SP ID), or a network access identifier (NAI) realm.

For example, the client device 516 may identify the serving network identifier of SQP server 504B of core network B 502B as the intended destination. The network access node 512 may then forward the SQP query message to the NAS layer (e.g., 812, FIG. 8) of the MME protocol stack (e.g., 808, FIG. 8) of the MME 508B. The NAS layer (e.g., 812, FIG. 8) may transfer the SQP query message to the SQP layer (e.g., 806, FIG. 8) in the SQP server (e.g., 814, FIG. 8) of the MME 508B. In this way, an SQP query that includes a serving network identifier may be sent from any type of network access node that supports RAN sharing. Use of the serving network identifier in the SQP query supports RAN sharing in network access nodes that have heretofore only supported one connectivity access network provider/service provider (e.g., APs operating according to IEEE 802.11, Wi-Fi, or Hotspot 2.0). By incorporating the serving network identifier into the SQP query, the network access node may direct the SQP query to a desired SQP server from among a plurality of SQP servers. Accordingly, in GWCN architecture 500, the network access node 512 may determine where to send the packets of an SQP query message based on the serving network identifier included in the SQP query message.

FIG. 6 relates to an exemplary aspect referred to herein as a Multi-Operator Core Network (MOCN) architecture 600 for network sharing. Each core network 602A, 602B, . . . , 602N includes its own SQP server 604A, 604B, . . . , 604N, where N is a positive integer. As illustrated in the aspect of FIG. 6, MOCN architecture 600 utilizes a shared MME 608, which is shared between the core networks 602A, 602B, . . . , 602N of the MOCN architecture 600 model. The core networks 602A, 602A, . . . , 602N are coupled to the shared MME 608.

FIG. 6 illustrates a network access node 612 coupled to a plurality of core networks 602A, 602A, . . . , 602N via the shared MME 608 in accordance with aspects described herein. Although one network access node 612 is illustrated in the RAN 614, it will be understood that the RAN 614 may include a plurality of network access nodes. The S1 interface, between the EUTRAN and the EPC is depicted as a dashed line between the RAN 614 and the shared MME 608. Again, usage of terminology associated with a given communication standard is not intended to limit the scope to that particular communication standard.

The aspect of FIG. 6 pertains to utilization of an SQP server in communication with a non-access stratum (NAS) layer of a protocol stack. A description of an exemplary protocol stack is provided herein.

In accordance with MOCN architecture 600, in the aspects described herein, a client device 616 may identify an intended destination of an SQP query message to the network access node 612 by use of the destination's serving network identifier. A serving network identifier may be, for example, a service set identifier (SSID), a public land mobile network identifier (PLMN ID), a service provider identifier (SP ID), or a network access identifier (NAI) realm.

For example, the client device 616 may identify the serving network identifier of SQP server 604B of core network B 502B as the intended destination. The network access node 612 may then forward the SQP query message to the NAS layer (e.g., 812, FIG. 8) of the MME protocol stack (e.g., 808, FIG. 8) of the shared MME 606. The NAS layer (e.g., 812, FIG. 8) may transfer the SQP query message to the SQP layer (e.g., 806, FIG. 8) in the SQP server (e.g., 814, FIG. 8) of core network B 502B. In this way, an SQP query that includes a serving network identifier may be sent from any type of network access node that supports RAN sharing. Use of the serving network identifier in the SQP query supports RAN sharing in network access nodes that have heretofore only supported one connectivity access network provider/service provider (e.g., APs operating according to IEEE 802.11, Wi-Fi, or Hotspot 2.0). By incorporating the serving network identifier into the SQP query, the network access node may direct the SQP query to a desired SQP server from among a plurality of SQP servers. As stated above, in MOCN the MME 608 is shared. Accordingly, in MOCN architecture 600, the shared MME 608 may determine where to send the packets of the SQP query based on the serving network identifier included in the SQP query message.

FIG. 7 relates to an exemplary aspect referred to herein as a Second Core Network architecture 700 for network sharing. In the Second Core network architecture 700, a network access node 712 may be coupled to a plurality of SQP servers 704A, 704B, . . . , 704N, where each of the plurality of SQP servers 704A, 704B, . . . , 704N includes data for a respective core network 702A, 702B, 702N. The exemplary illustration of FIG. 7 relates to utilization of SQP servers 704A, 704B, . . . , 704N that reside within a given RAN 714. As with the GWCN architecture 500 and MOCN architecture 600 described above in connection with FIG. 5 and FIG. 6, each connectivity access network provider/MNO may have its own SQP server. Nevertheless, it will be understood that while N SQP servers 704A, 704B, . . . , 704N are illustrated in FIG. 7, the content of the N SQP servers 704A, 704B, . . . , 704N could be included in fewer than N SQP servers. For example, the plurality of SQP servers 704A, 704B, . . . , 704N may be implemented as a plurality of logical SQP servers, where a physical server may be logically subdivided into the plurality of logical SQP servers.

In the exemplary aspect of FIG. 7, the SQP servers 704A, 704B, . . . , 704N (e.g., implemented as logical or physical servers) reside in the RAN 714 with a network access node 712. In LTE terms, the SQP servers 704A, 704B, . . . , 704N reside in the Evolved UMTS Terrestrial Radio Access Network (EUTRAN) side with the eNB, not on the Evolved Packet Core (EPC) side of a network. Again, usage of terminology associated with a given communication standard is not intended to limit the scope to that particular communication standard.

FIG. 7 illustrates a network access node 712 that is coupled to N core networks 702A, 702B, . . . , 702N in accordance with aspects described herein. Communication may take place by messaging transported over an RRC layer or an NAS layer as described above. The S1 interface, between the EUTRAN and the EPC is depicted as a dashed line between RAN 714 and the core networks 702A, 702B, . . . , 702N.

Although only one network access node 712 is presented as being included in the RAN 714, it will be understood that the RAN 714 may include a plurality of network access nodes.

In accordance with Second Core Network architecture 700, in the aspects described herein, a client device 716 may identify an intended destination of an SQP query message to the network access node 712 by use of the destination's serving network identifier. The destination's serving network identifier may be associated with its respective SQP server 704A, 704B, . . . , 704N residing in the RAN 714. A serving network identifier may be, for example, a service set identifier (SSID), a public land mobile network identifier (PLMN ID), a service provider identifier (SP ID), or a network access identifier (NAT) realm.

For example, the client device 716 may identify the serving network identifier of SQP server 704B of core network B 702B as the intended destination. The SQP query may be transported across the RRC layer from RRC layer (e.g., 910, FIG. 9) of the client device 716 to RRC layer (e.g., 912, FIG. 9) of the network access node 712 (e.g., ENBU/AP) protocol stack (e.g., 908, FIG. 9). The RRC layer (e.g., 912, FIG. 9) may transfer the SQP query message to the SQP layer (e.g., 906, FIG. 9) in the SQP server 704B (e.g., 914, FIG. 9) associated with core network B 702B. In this way, an SQP query that includes a serving network identifier may be sent from any type of network access node that supports RAN sharing. Use of the serving network identifier in the SQP query supports RAN sharing in network access nodes that have heretofore only supported one connectivity access network provider/service provider (e.g., APs operating according to IEEE 802.11, Wi-Fi, or Hotspot 2.0). By incorporating the serving network identifier into the SQP query, the network access node may direct the SQP query to a desired SQP server from among a plurality of SQP servers. In the case of Second Core Network architecture 700, transport may occur on the RRC layer. Accordingly, in Second Core Network architecture 700, the network access node 712 may determine where to send the packets of the SQP query message based on the serving network identifier included in the SQP query message.

Because the core networks 702A, 702B, . . . , 702N could be using either GWCN architecture 500 or MOCN architecture 600, the Second Core Network architecture 700 could also correspond to GWCN architecture 500 or MOCN architecture 600.

Exemplary Control Plane Protocol Stacks

Figure 8:
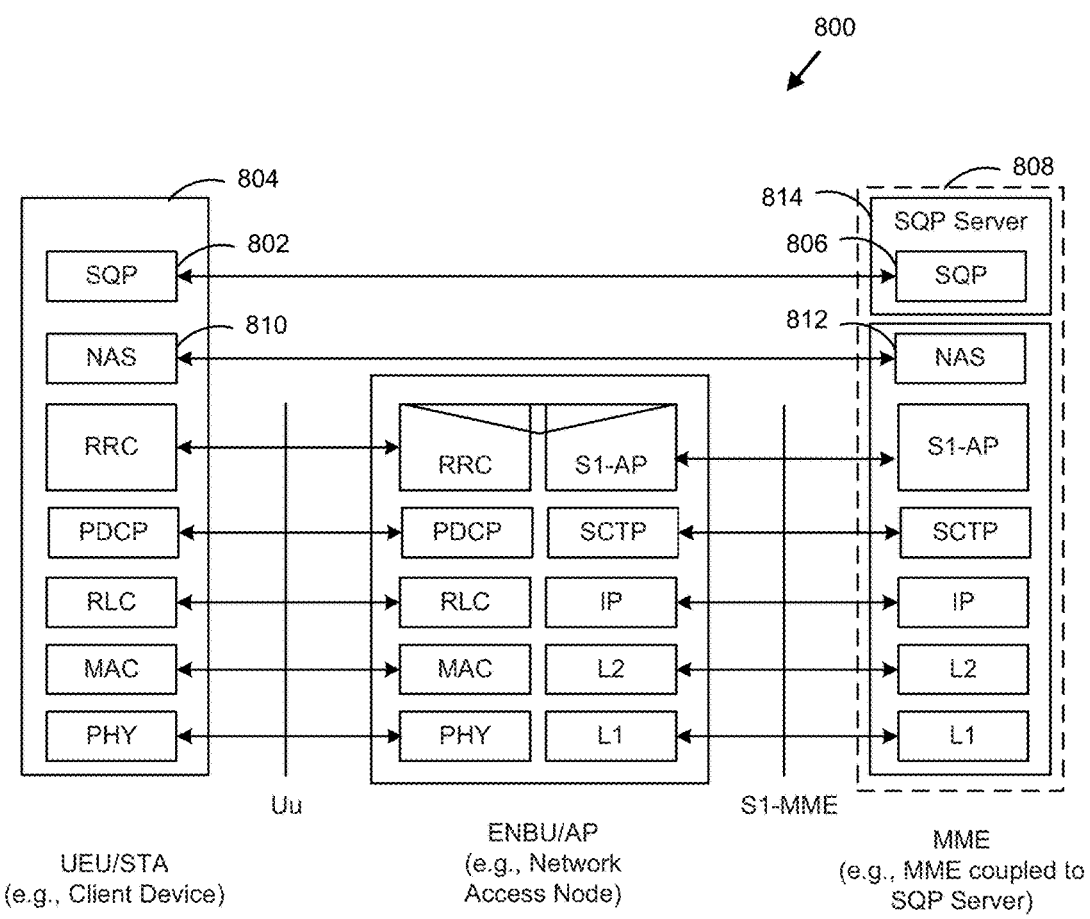
FIG. 8 illustrates control plane protocol stacks of a network in accordance with an exemplary aspect.

SQP signaling may be performed over NAS transport. FIG. 8 illustrates control plane protocol stacks 800 of a network in accordance with an exemplary aspect. In one aspect, the network may be a next generation (5G) network. In comparison to known protocol stacks, SQP layer 802, 806 may be new or may have a new use. Alternate names for this layer are acceptable. The SQP layer 802 implemented in the UEU/STA stack 804 is at the same level as the SQP layer 806 implemented in the MME protocol stack 808. The SQP layer 802 implemented in the UEU/STA stack 804 is higher than the NAS layer 810 in the UEU/STA stack 804. The SQP layer 806 implemented in the MME protocol stack 808 is higher than the NAS layer 812 in the MME protocol stack 808.

The protocol stacks of FIG. 8 may be for an SQP query/response between a client device and an SQP server 814 over NAS layer 810, 812. FIG. 8 illustrates SQP layer 806 within an SQP server 814. This illustration is meant to depict an association of the SQP layer 806 of a first RAN provider (or connectivity access network provider) with an SQP server 814 that is uniquely associated with the first RAN provider (or connectivity access network provider). It is not meant to identify a protocol stack layer named "SQP Server."

Figure 9:
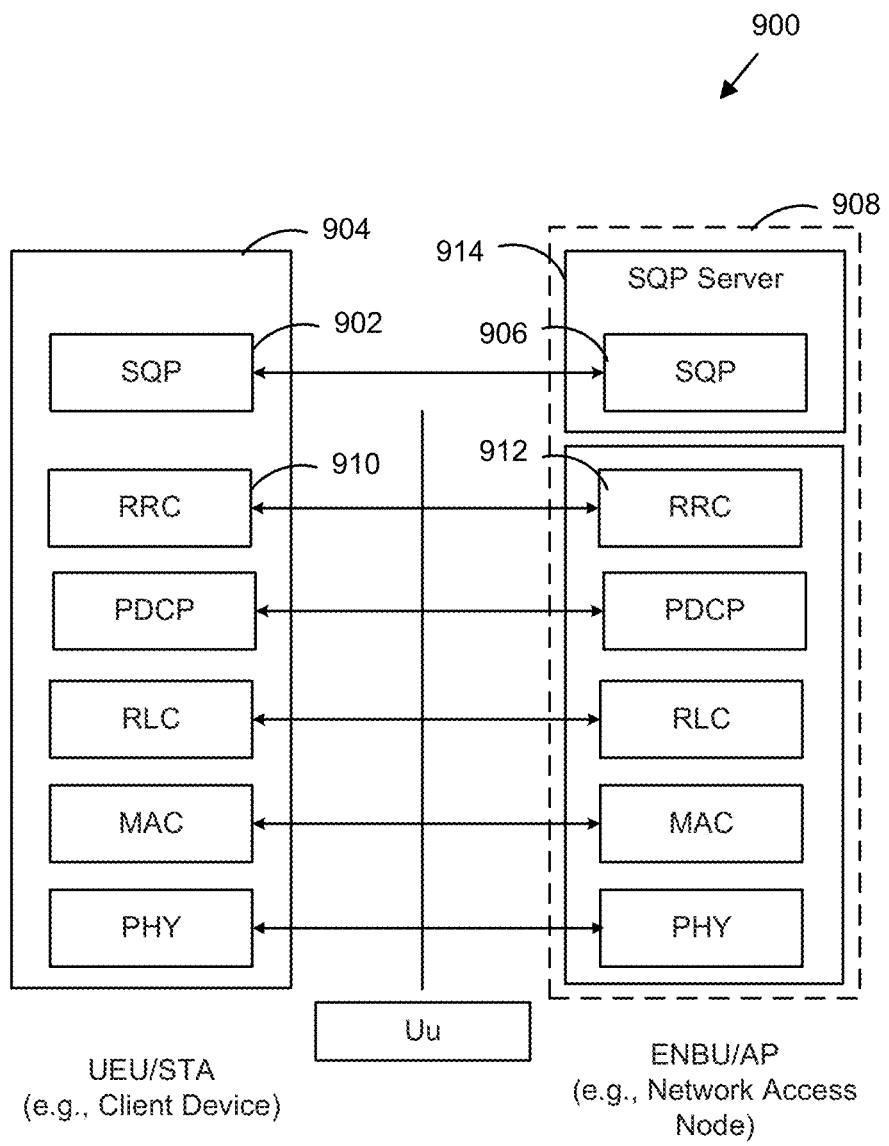
FIG. 9 illustrates control plane protocol stacks of a network in accordance with another exemplary aspect.

As an alternative, SQP signaling may be performed over RRC transport. FIG. 9 illustrates control plane protocol stacks 900 of a network in accordance with another exemplary aspect. In one aspect, the network may be a next generation (5G) network. In comparison to known protocol stacks, the Service Query Protocol (SQP) layer 902, 906 is new or is used in a new way. Alternate names for this layer are acceptable. The SQP layer 902 implemented in the UEU/STA stack 904 is at the same level as the SQP layer 906 implemented in the network access node (e.g., ENBU/AP) protocol stack 908. The SQP layer 902 implemented in the UEU/STA stack 904 is higher than the RRC layer 910 in the UEU/STA stack 904. The SQP layer 906 implemented in the network access node (e.g., ENBU/AP) protocol stack 908 is higher than the RRC layer 912 in the network access node (e.g., ENBU/AP) protocol stack 908.

The protocol stacks of FIG. 9 may be for an SQP query/response between a client device and an SQP server 914 over RRC layer 910, 912. FIG. 9 illustrates SQP layer 906 within an SQP server 914. This illustration is meant to depict an association of the SQP layer 906 of a first RAN provider (or connectivity access network provider) with the SQP server 914 that is uniquely associated with the first RAN provider (or connectivity access network provider). It is not meant to identify a protocol stack layer named "SQP Server."

Two exemplary alternatives exist in implementation of the SQP over RRC protocol stack as illustrated in the aspect of FIG. 9. Each alternative is explained below.

According to a first alternative aspect, a client device may establish an RRC connection with a network access node. As understood from previous discussions, the network access node may be exemplified by, for example, an eNB or an AP. According to the first alternative aspect, the client device may establish the RRC connection with the network access node with a cause code identified as/named "SQP query". The network access node may reply to the SQP query with an "SQP response" containing the information requested by the client device in the SQP query.

According to a second alternative aspect, new initial RRC messages identified as/named "RRC SQP Query" and "RRC SQP Response" may be utilized for a device to perform "Service Discovery" without any need for RRC connection establishment. This solution is potentially the most optimal in terms of signaling.

To implement the second alternative aspect, the client device may initiate a random access channel (RACH), and after network access node response, the client device may send a new RRC SQP Query. By way of example, the network access node response may be the same or similar to an eNB response (e.g., "Message 2"). Also by way of example, the RRC SQP Query may be a request for information regarding available service provider information and an authentication method. The network access node may reply with the new RRC SQP Response. The transaction may be assumed to be finished after the RRC SQP Response.

This second alternative aspect may use a specific RACH; the network access node might provide certain/specific resources for the transaction.

Service Query Protocol (SQP) Call Flow

Figure 10:
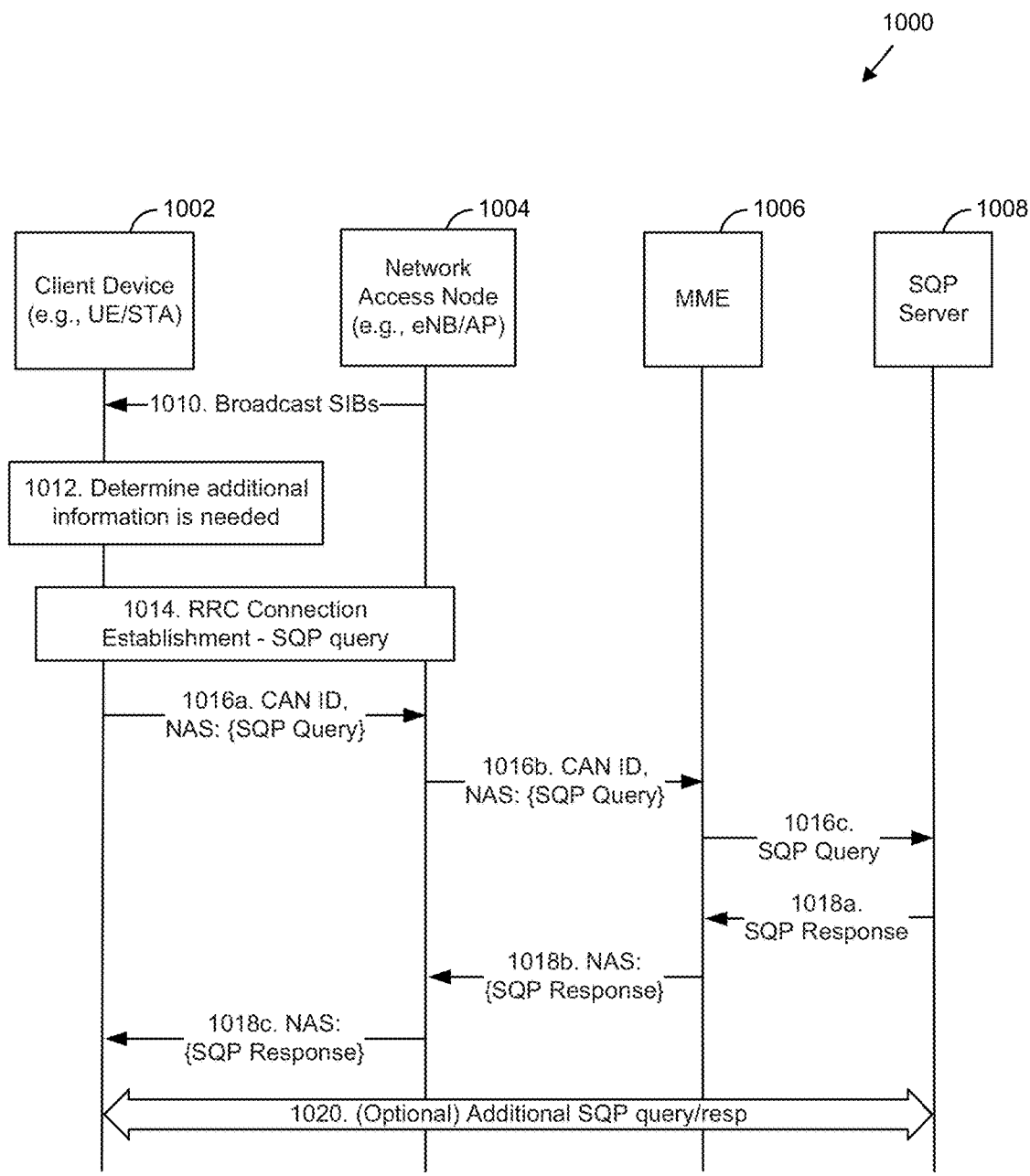
FIG. 10 illustrates a first call flow diagram in accordance with a first exemplary aspect.

FIG. 10 illustrates a first call flow diagram 1000 in accordance with a first exemplary aspect. The aspect of FIG. 10 may find utility in a next generation (5G) network, but is not limited thereto.

The procedures of the call flow of FIG. 10 assume use of NAS transport for SQP signaling. Alternatively, steps 1016a-c and 1018a-c can be performed over RRC transport (in which case the SQP query may or may not be routed through an MME 1006).

Turning now to FIG. 10, a network access node 1004 (e.g., eNB/AP) may broadcast 1010 information (e.g., capability information) in a SIB1 (system information block-type 1) beacon, to indicate, for example: one or more CAN IDs; availability of RAN sharing (i.e., that the network access node is shared by a plurality of connectivity access networks); availability of SQP; and/or to provide a list of serving network identifiers, MNOs, connectivity access network providers, and/or service providers associated with the network access node 1004 (e.g., eNB/AP).

A client device 1002 (e.g., UE/STA) may determine 1012 that additional information may be needed. The determination may occur after the broadcast (e.g., SIB1 beacon) is detected and decoded. If additional information is needed, the client device 1002 may determine whether to obtain an element of information related to a service parameter from the network access node 1004. For example, the client device 1002 may determine that additional information about one of the MNOs/connectivity access network providers/service providers identified in the broadcast from the network access node 1004 may be needed before the client device 1002 attaches to this network.

The client device 1002 may establish 1014 an RRC connection with network access node 1004. The RRC connection may be authenticated or unauthenticated. The connection may be established by including a new cause code, for example "SQP query" in an RRC connection request, or by other methods.

Using the RRC connection, the client device 1002 may send 1016a an SQP query over NAS signaling, where the SQP query may be associated with a serving network identifier. The serving network identifier may uniquely identify by an SQP server 1008. The serving network identifier may be a CAN ID or some other identifier. The SQP query may include a request for information for service discovery to determine the service information of the connectivity access network (CAN) provider/MNO/service provider associated with the serving network identifier associated with the SQP server 1008.

A processing circuit of the client device 1002 may configure the query according to one of a plurality of modes. For example, the processing circuit may configure the query according to a first mode, and may include, as the element of information, a null-value. The processing circuit may configure the query according to a second mode, and may include, as the element of information, a service. The processing circuit may alternatively configure the query according to a second mode, and may include, as the element of information, an identifier of a connectivity access network and/or a service provider. The processing circuit may alternatively configure the query according to a third mode, and may include, as the element of information, an identifier of a connectivity access network and/or service provider that was not identified in a broadcast made by a network access node.

The SQP query may be forwarded 1016b to the NAS layer of an MME 1006. The MME 1006 may forward 1016c the SQP query from the NAS layer of the MME 1006 to the SQP layer of the SQP server 1008 associated with the serving network identifier. The SQP server 1008 may return 1018a an SQP response to the MME 1006. The MME 1006 may return 1018b the SQP response to the network access node 1004. The network access node 1004 may return 1018c the SQP response to the client device 1002. The SQP response, may include elements of information relevant to the SQP query.

The client device 1002 may perform 1020 additional query and response exchanges with the SQP server 1008. Additionally or alternatively, the client device 1002 may perform additional query and response exchanges with another SQP server (not shown) associated with the network access node 1004 by using a different serving network identifier.

In one alternative aspect, the SQP signaling may be transported over Generic NAS transport as defined in 3GPP Technical Specification (TS) 24.301. For example, a new type of Generic NAS transport known as "SQP" may be defined for the receiving NAS layer to be able to provide the receiving message to the correct SQP layer. Alternatively, a new NAS SQP query/response pair of messages in accordance with aspects described herein may be defined.

In the case of GWCN (see FIG. 5), the network access node 1104 may determine which MME to forward the SQP query to, based on the serving network identifier, i.e., the network access node 1104 might perform the MME selection for SQP.

In the case of MOCN (see FIG. 6), the network access node 1104 may forward the SQP query to a shared MME (e.g., 608, FIG. 6) for the shared MME 608 to perform SQP server selection based on the serving network identifier associated with the SQP query.

Figure 11:
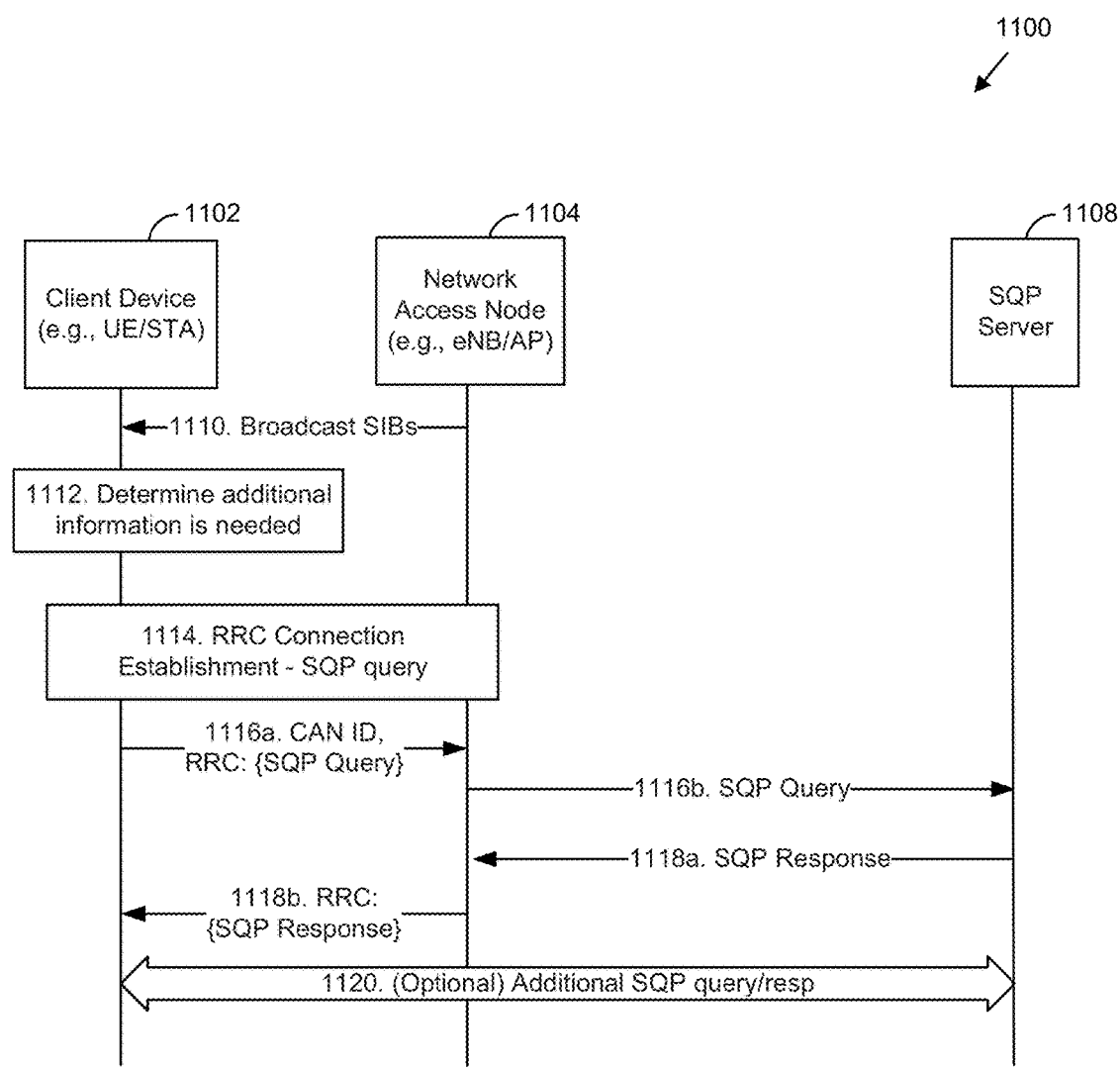
FIG. 11 illustrates a second call flow diagram in accordance with a second exemplary aspect.

FIG. 11 illustrates a second call flow diagram 1100 in accordance with a second exemplary aspect. The aspect of FIG. 11 may find utility in a next generation (5G) network but is not limited thereto.

The procedures of the call flow of FIG. 11 assume use of RRC for transport of SQP signaling.

Turning now to FIG. 11, a network access node 1104 (e.g., eNB/AP) may broadcast 1110 information, for example in a SIB1 beacon, to indicate: one or more CAN IDs: availability of RAN sharing (i.e., that the network access node is shared by a plurality of connectivity access networks), availability of SQP, and/or to provide a list of serving network identifiers, MNOs, connectivity access network providers, and/or service providers associated with the network access node 1104 (e.g., eNB/AP).

A client device 1002 (e.g., UE/STA) may determine 1012 that additional information may be needed. The determination may occur after the broadcast (e.g., SIB1 beacon) is detected and decoded. If additional information is needed, the client device 1002 may determine whether to obtain an element of information related to a service parameter from the network access node 1004. For example, the client device 1002 may determine that additional information about one of the MNOs/connectivity access network providers/service providers identified in the broadcast from the network access node 1004 may be needed before the client device 1002 attaches to this network.

The client device 1102 may establish 1114 an RRC connection with the network access node 1104. The RRC connection may be authenticated or unauthenticated. The connection may be established by including a new cause code, for example "SQP query" in the RRC connection request, or by other methods.

Using the RRC connection, the client device 1102 may send 1116a an SQP query over RRC signaling to the RRC layer of the network access node 1104. The SQP query may be associated with a serving network identifier. The serving network identifier may uniquely identify by an SQP server 1108. The serving network identifier may be a CAN ID or some other identifier. The SQP query may include a request for information for service discovery to determine the service information of the connectivity access network (CAN) provider/MNO/service provider associated with the serving network identifier associated with the SQP server 1108.

The network access node 1104 may forward 1116b the SQP query from the RRC layer of the network access node 1104 to the SQP layer of the SQP server 1108 associated with the serving network identifier. The SQP server 1108 may return 1118a an SQP response to the network access node 1104. The network access node 1104 may return 1118b the SQP response to the client device 1102 over RRC signaling. The SQP response, may include elements of information relevant to the SQP query.

The client device 1102 may perform 1120 additional query and response exchanges with the SQP server 1108. Additionally or alternatively, the client device 1102 may perform additional query and response exchanges with another SQP server (not shown) associated with the network access node 1104 by using a different serving network identifier.

Figure 12:
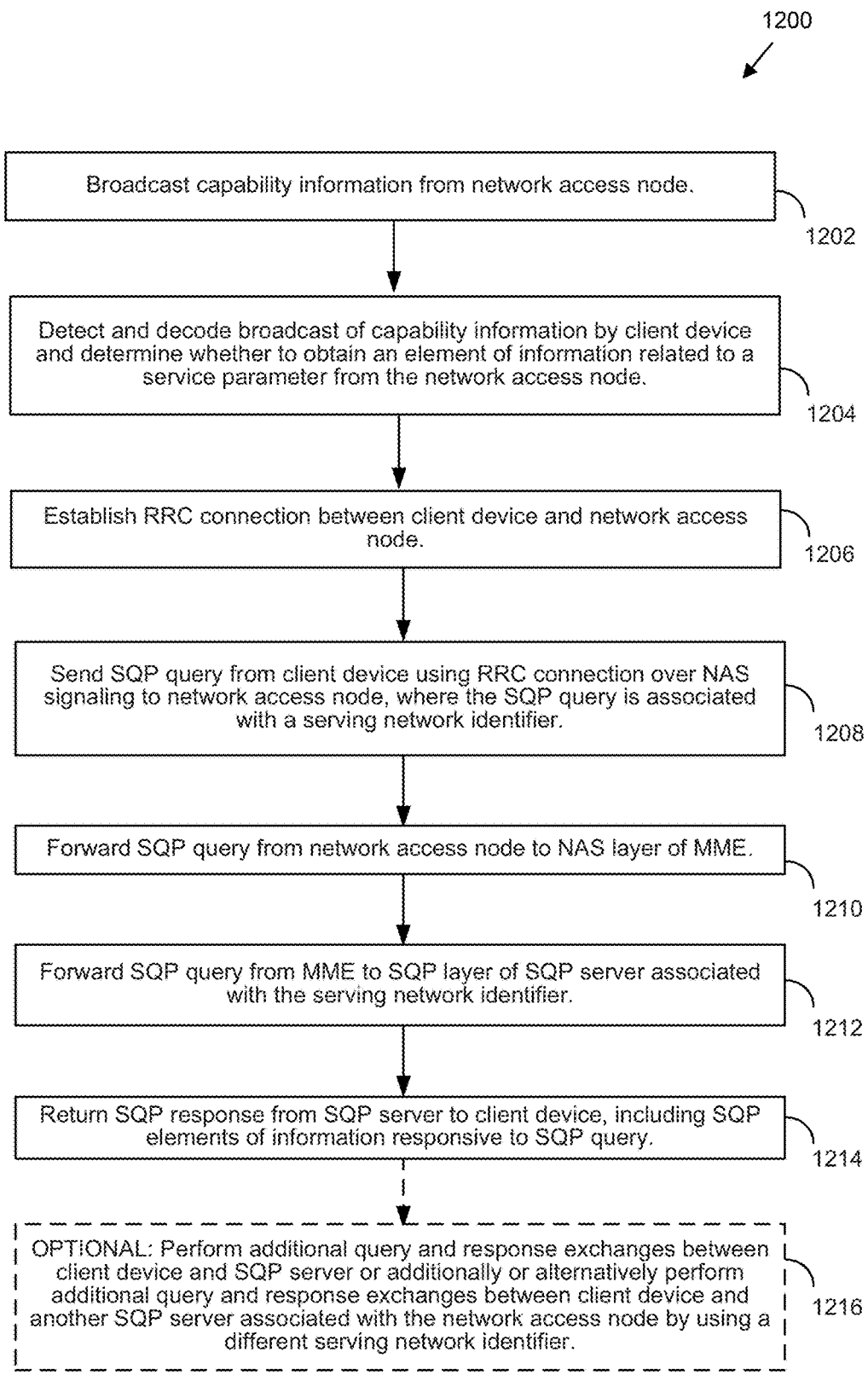
FIG. 12 is a block diagram illustrating an exemplary method in accordance with an exemplary call flow.

FIG. 12 is a block diagram illustrating an exemplary method in accordance with an exemplary call flow. The call flow may be similar, for example, to that of FIG. 10. The exemplary method may be operational, for example, at a client device or at a network access node. A network access node may broadcast information (e.g., capability information) in an over-the-air broadcast to advertise the capabilities of the network access node 1202. The broadcast may include information such as, for example, CAN ID, availability of RAN sharing, availability of SQP, and/or list of serving network identifiers of MNOs/connectivity access network providers/service providers associated with the network access node. A client device may detect and decode the broadcast and determine whether to obtain an element of information related to a service parameter from the network access node 1204. The element of information may be a subset (e.g., less than an entire set) of a set of elements of information stored in a server that implements a service query protocol (SQP). The client device and network access node may establish an RRC connection 1206. The RRC connection may be authenticated or unauthenticated. The RRC connection may be established by including a new cause code, for example "SQP query" in the RRC connection request, or by other methods.

Using the RRC connection, the client device may send an SQP query over NAS signaling to the network access node 1208. The SQP query may be associated with a serving network identifier. In some aspects, the serving network identifier may uniquely identify an SQP server. The SQP query may be forwarded from the network access node to an NAS layer of an MME 1210. The MME may forward the SQP query to an SQP layer of the SQP server associated with the serving network identifier 1212. The SQP server may return an SQP response, including relevant elements of information responsive to the SQP query, to the client device 1214. The client device may optionally perform additional query and response exchanges with the SQP server or additionally or alternatively may perform additional query and response exchanges with another SQP server associated with the network access node by using a different serving network identifier 1216.

Figure 13:
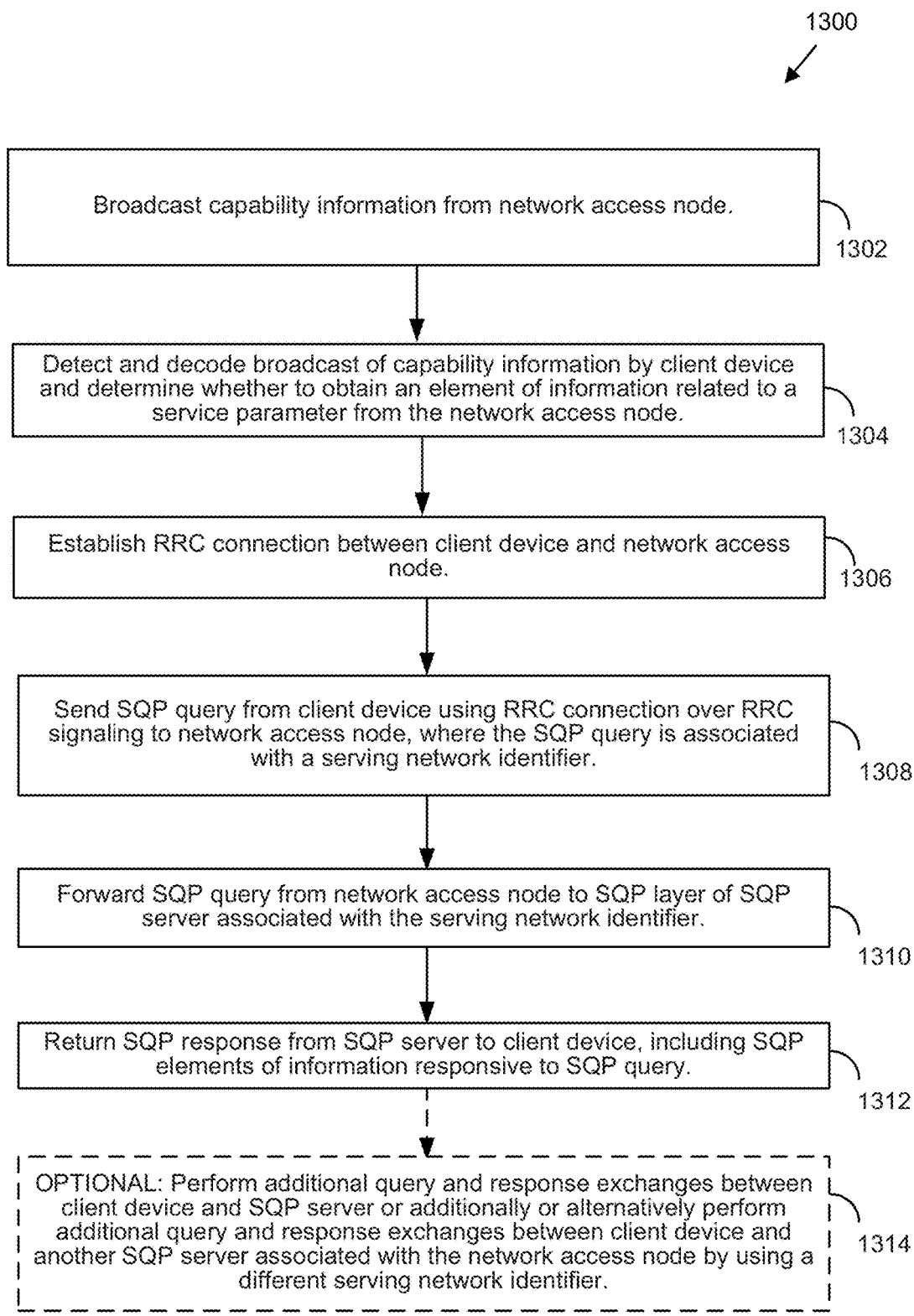
FIG. 13 is a block diagram illustrating an exemplary method in accordance with another exemplary call flow.

FIG. 13 is a block diagram illustrating an exemplary method 1300 in accordance with another exemplary call flow. The call flow may be similar, for example, to that of FIG. 11. The exemplary method may be operational, for example, at a client device or at a network access node. A network access node may broadcast information (e.g., capability information) in an over-the-air broadcast to advertise the capabilities of the network access node 1302. The broadcast may include information such as, for example, CAN ID, availability of RAN sharing, availability of SQP and/or list of serving network identifiers of MNOs/connectivity access network providers/service providers associated with the network access node. A client device may detect and decode the broadcast and determine whether to obtain an element of information related to a service parameter from the network access node 1304. The element of information may be a subset (e.g., less than an entire set) of a set of elements of information stored in a server that implements a service query protocol (SQP). The client device and network access node may establish an RRC connection 1306. The RRC connection may be authenticated or unauthenticated. The RRC connection may be established by including a new cause code, for example "SQP query" in the RRC connection request, or by other methods.

Using the RRC connection, the client device may send an SQP query over RRC signaling to the network access node 1308. The SQP query may be associated with a serving network identifier. The serving network identifier may uniquely identify an SQP server. The SQP query may be forwarded from the network access node to an SQP layer of the SQP server associated with the serving network identifier 1310. The SQP server may return an SQP response, including relevant elements of information responsive to the SQP query, to the client device 1312. The client device may optionally perform additional query and response exchanges with the SQP server or additionally or alternatively may perform additional query and response exchanges with another SQP server associated with the network access node by using a different serving network identifier 1314.

Exemplary Client Device (e.g., UE)

Figure 14:
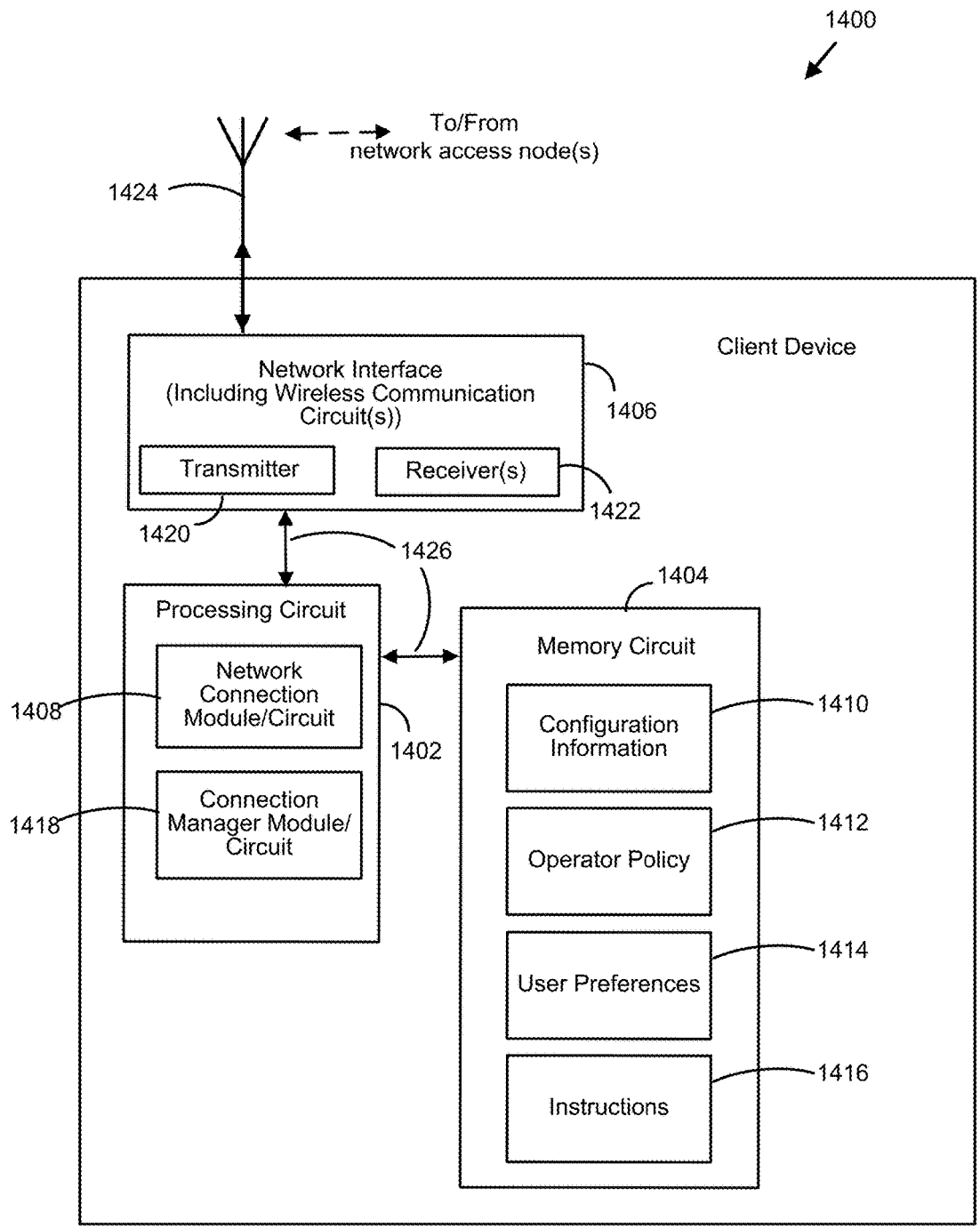
FIG. 14 is a functional block diagram of one aspect of an exemplary client device that may implement service query protocol.

FIG. 14 is a functional block diagram of one aspect of an exemplary client device 1400 that may implement service query protocol. The client device 1400 may generally include a processing circuit 1402 (e.g., processor, processing module, etc.) coupled to a memory circuit 1404 (e.g., memory, memory device, memory module, etc.), and a network interface 1406, where the network interface 1406 may include a wireless communication circuit.

The processing circuit 1402 may be configured to establish a wireless connection with, for example, network access nodes (e.g., network access node 236, 238) via the network interface 1406, to send and/or receive information to/from a network and/or service provider (via the network access nodes). Transmission and/or reception of communication signals may be through an antenna 1424. One antenna 1424 is shown for illustrative purposes; however, it will be understood that the client device 1400 may have one or more antennae 1424 to support, for example, multiple input multiple output (MIMO) operations. The processing circuit 1402 may be coupled to the memory circuit 1404 such that the processing circuit 1402 can read information from, and write information to, the memory circuit 1404. The memory circuit 1404 may include data representative of configuration information 1410 of a present configuration of the client device 1400 and/or any potential future configuration options of the client device 1400. The memory circuit 1404 may further include data representative of operator policies 1412, for example, identification of partner networks (e.g., Organization Identifier (OI) or PLMN identifiers) that are acceptable for the client device 1400 to connect to, etc. An OI is a unique identifier assigned to a service provider when the service provider registers with an IEEE registration authority. An AP can include a service provider OI in beacons and probe responses to client devices. A Public Land Mobile Network (PLMN) is a network that is established and operated by an administration or by a recognized operating agency (ROA) for the purpose of providing land mobile telecommunications services to the public. A PLMN is identified by the Mobile Country Code (MCC) and the Mobile Network Code (MNC). Each operator providing mobile services may have its own PLMN. PLMNs interconnect with other PLMNs and Public Switched Telephone Networks (PSTNs) for telephone communications or with Internet service providers for data and Internet access of which links are defined as interconnect links between providers.

The memory circuit 1404 may include data representative of user preferences 1414, such as, for example, whether roaming is permitted, etc. The memory circuit 1404 may include instructions 1416 that when executed by the processing circuit 1402 may cause the processing circuit 1402 to perform methods such as those described in the exemplary aspects disclosed herein.

The processing circuit 1402 may also include a network connection module/circuit 1408 for establishing a network connection (via the network interface 1406) with one or more network access nodes (e.g., APs, eNBs). The processing circuit 1402 may also include a connection manager module/circuit 1418, which may utilize information received from a network access node, configuration information 1410, operator policies 1412, and user preferences 1414 to automate connectivity access network/service provider selection and traffic steering to a network access node.

The network interface 1406 may include one or more transmitters 1420 and one or more receivers 1422. The one or more transmitters 1420 may configured to send packets for one or more active communication sessions. The one or more receivers 1422 may be configured to allow the client device 1400 to maintain one or more active communication sessions with one or more network access nodes.

The client device 1400 may further include at least one communication bus 1426, which couples the various modules/devices of the client device 1400 to one another.

According to one or more features, the processing circuit 1402 may be configured to perform any or all of the processes, functions, steps and/or routines described herein. As used herein, the term "configured" in relation to the processing circuit 1402 may refer to the processing circuit 1402 being one or more of adapted, employed, implemented, or programmed to perform a particular process, function, step, and/or routine according to various features or aspects described herein.

Figure 15:
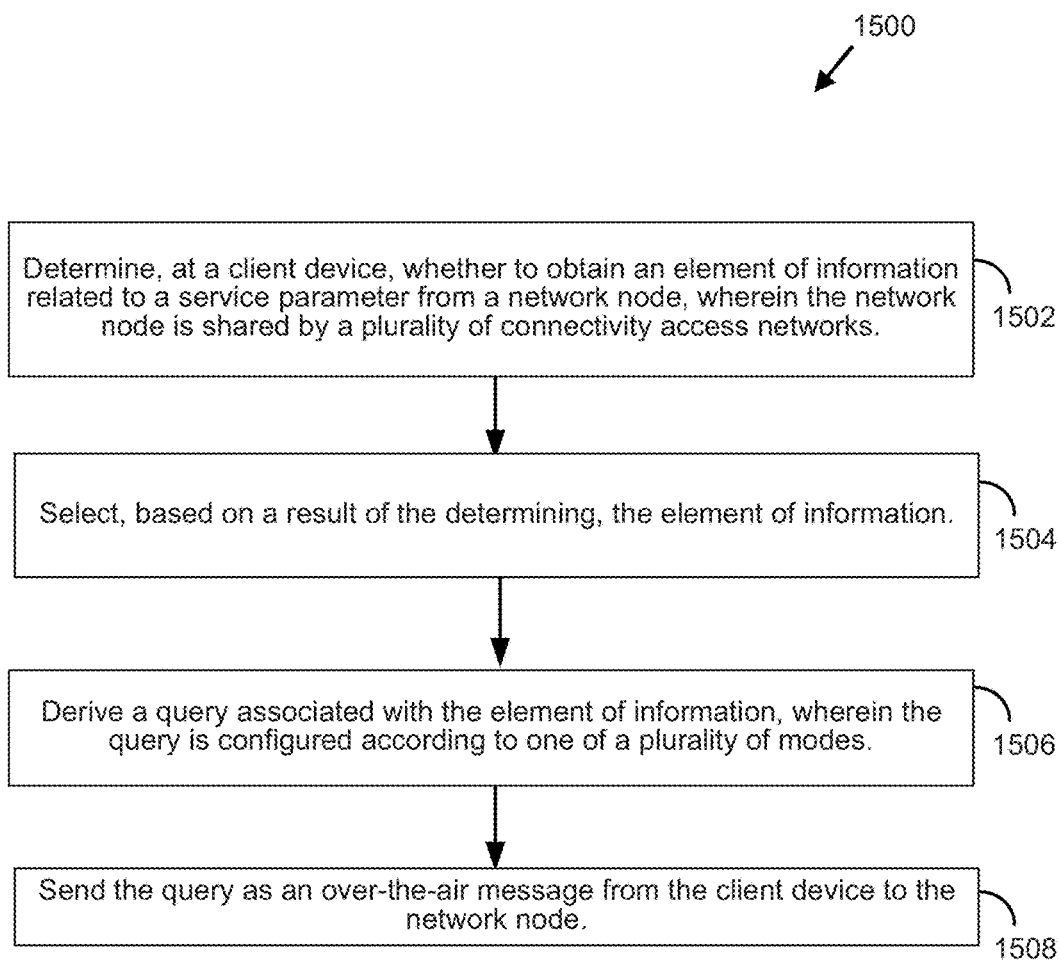
FIG. 15 is a first exemplary method operational in an exemplary client device in accordance with an exemplary aspect described herein.

FIG. 15 is a first exemplary method 1500 operational in an exemplary client device in accordance with an exemplary aspect described herein. The exemplary client device may be similar, for example, to the exemplary client device 1400 of FIG. 14. The method 1500 may begin by determining, at the client device, whether to obtain an element of information related to a service parameter from an access node (e.g., a network access node), wherein the access node may be shared by a plurality of connectivity access networks 1502. The element of information may be a subset (e.g., less than an entire set) of a set of elements of information stored in a server that implements a service query protocol (SQP). Any of the plurality of connectivity access networks may be associated with a plurality of services and/or service providers. As used herein, a connectivity access network may be operated by a connectivity access network provider (sometimes referred to as an MNO). The terms connectivity access network provider and service provider may be understood as references to separate entities; however, nothing herein is intended to preclude a connectivity access network provider from being both a connectivity access network provider and a service provider. Likewise, nothing herein is intended to preclude a service provider from being both a connectivity access network provider and a service provider.

Subsequent to making the determination of whether to obtain the element of information related to the service parameter from the access node, a step of selecting the element of information may be performed 1504. Selecting the element of information may be based on a result of the previous step of determining whether to obtain the element of information. The element of information may be a subset (e.g., less than an entire set) of a set of elements of information stored in a server that implements a service query protocol (SQP). The element of information may become a basis for, or a part of, a query to be sent to the access node.

Upon selection of the element of information, a step of deriving a query associated with the element of information may be undertaken 1506. The query may be configured according to one of a plurality of modes. Next, the query may be sent as an over-the-air message from the client device to the access node 1508. The message may be sent as an authenticated or unauthenticated message. In one aspect, the over-the-air message may be sent as an unauthenticated message from the client device to the access node before the client device attaches to the access node. In this way, the client device can communicate with the access node without having to commit to a connectivity access network. In some aspects, the message may be conveyed in a layer 3 message.

In some aspects, the message may be conveyed via a radio resource control (RRC) message and/or a non-access stratum (NAS) message.

Figure 16:
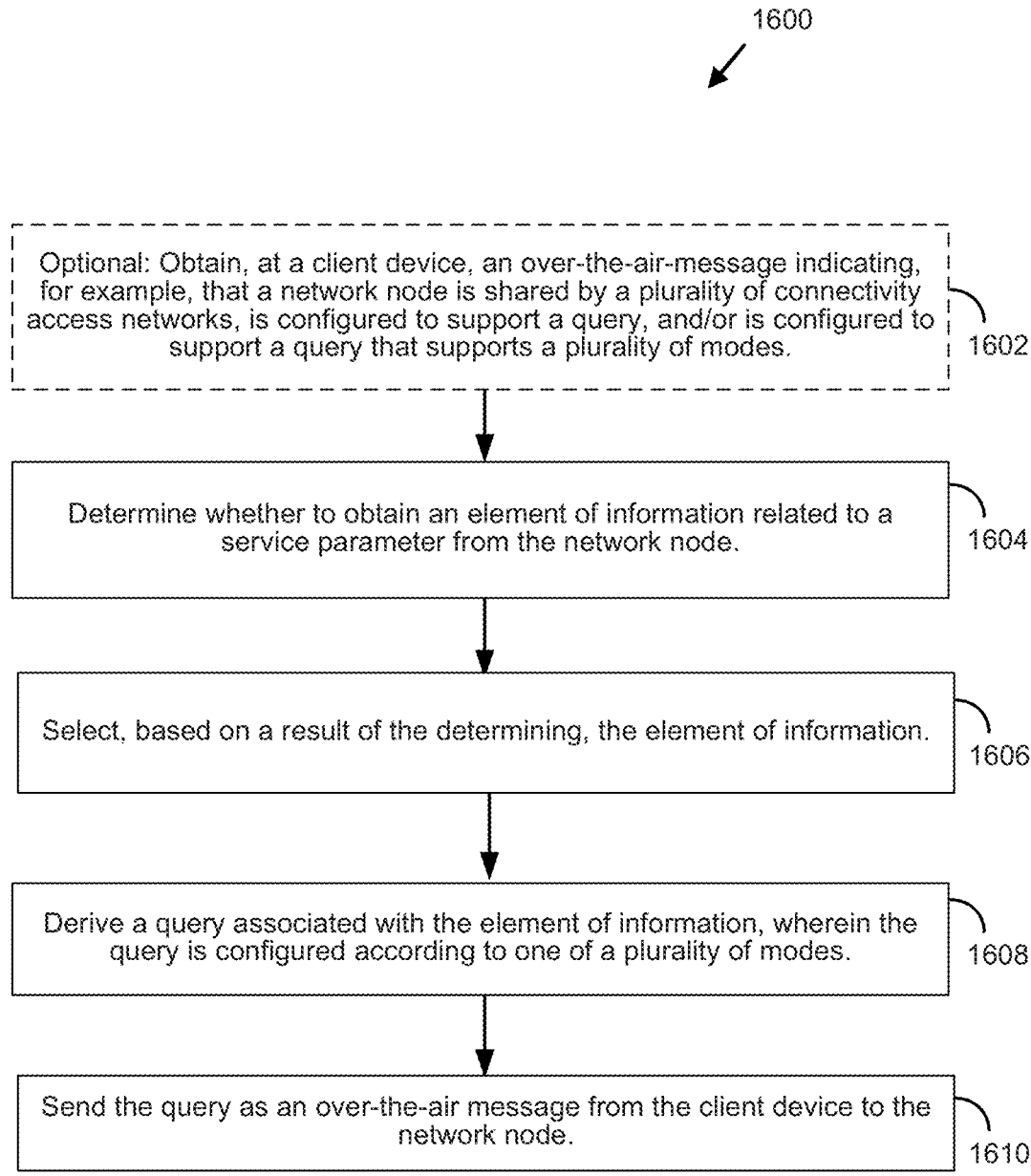
FIG. 16 is a second exemplary method operational in an exemplary client device in accordance with an exemplary aspect described herein.

FIG. 16 is a second exemplary method 1600 operational in an exemplary client device in accordance with an exemplary aspect described herein. The exemplary client device may be similar, for example, to the exemplary client device 1400 of FIG. 14. The method 1600 may begin with an optional step of obtaining, at the client device, an over-the-air message that indicates, for example, that an access node (e.g., a network access node) supports a plurality of connectivity access networks, is configured to support a query such as a service query, and/or is configured to support a query that supports a plurality of modes 1602. The method may continue by determining, in response to the over-the-air message, whether to obtain an element of information related to a service parameter from the access node 1604. The element of information may be a subset (e.g., less than an entire set) of a set of elements of information stored in a server that implements a service query protocol (SQP). The element of information may be needed in a process to determine to which of the plurality of connectivity access networks the client device is to become attached. Any of the plurality of connectivity access networks may be associated with a plurality of services and/or service providers; accordingly, a need may exist for the client device to select one connectivity access network over another. Selection may be based on one or more factors. Factors may include whether a desired service or service provider is available via a given connectivity access network and/or whether the client device has a subscription to the given connectivity access network (and/or the service and/or service provider available via the connectivity access network). Substantive data relating to these and/or other factors may be determined based on data represented by selected elements of information, which may be obtained from the access node. As used herein, a connectivity access network may be operated by a connectivity access network provider (sometimes referred to as an MNO). The terms connectivity access network provider and service provider may be understood as references to separate entities; however, nothing herein is intended to preclude a connectivity access network provider from being both a connectivity access network provider and a service provider. Likewise, nothing herein is intended to preclude a service provider from being both a connectivity access network provider and a service provider.

Subsequent to making the determination of whether to obtain the element of information related to the service parameter from the access node, a step of selecting the element of information may be performed 1606. Selecting the element of information may be based on a result of the previous step of determining whether to obtain the element of information. The element of information may be a subset (e.g., less than an entire set) of a set of elements of information stored in a server that implements a service query protocol (SQP). The element of information may become a basis for, or a part of, a query to be sent to the access node.

Upon selection of the element of information, a step of deriving a query associated with the element of information may be undertaken 1608. The query may be configured according to one of a plurality of modes. Next, the query may be sent as an over-the-air message from the client device to the access node 1610. The over-the-air message may be sent as an unauthenticated message from the client device to the access node before the client device attaches to the access node. In this way, the client device can communicate with the access node without having to commit to a connectivity access network. In some aspects, the unauthenticated message may be conveyed in a layer 3 message. In some aspects, the unauthenticated messages may be conveyed via a radio resource control (RRC) message and/or a non-access stratum (NAS) message.

Exemplary Network Node (e.g., eNB, AP, MME)

Figure 17:
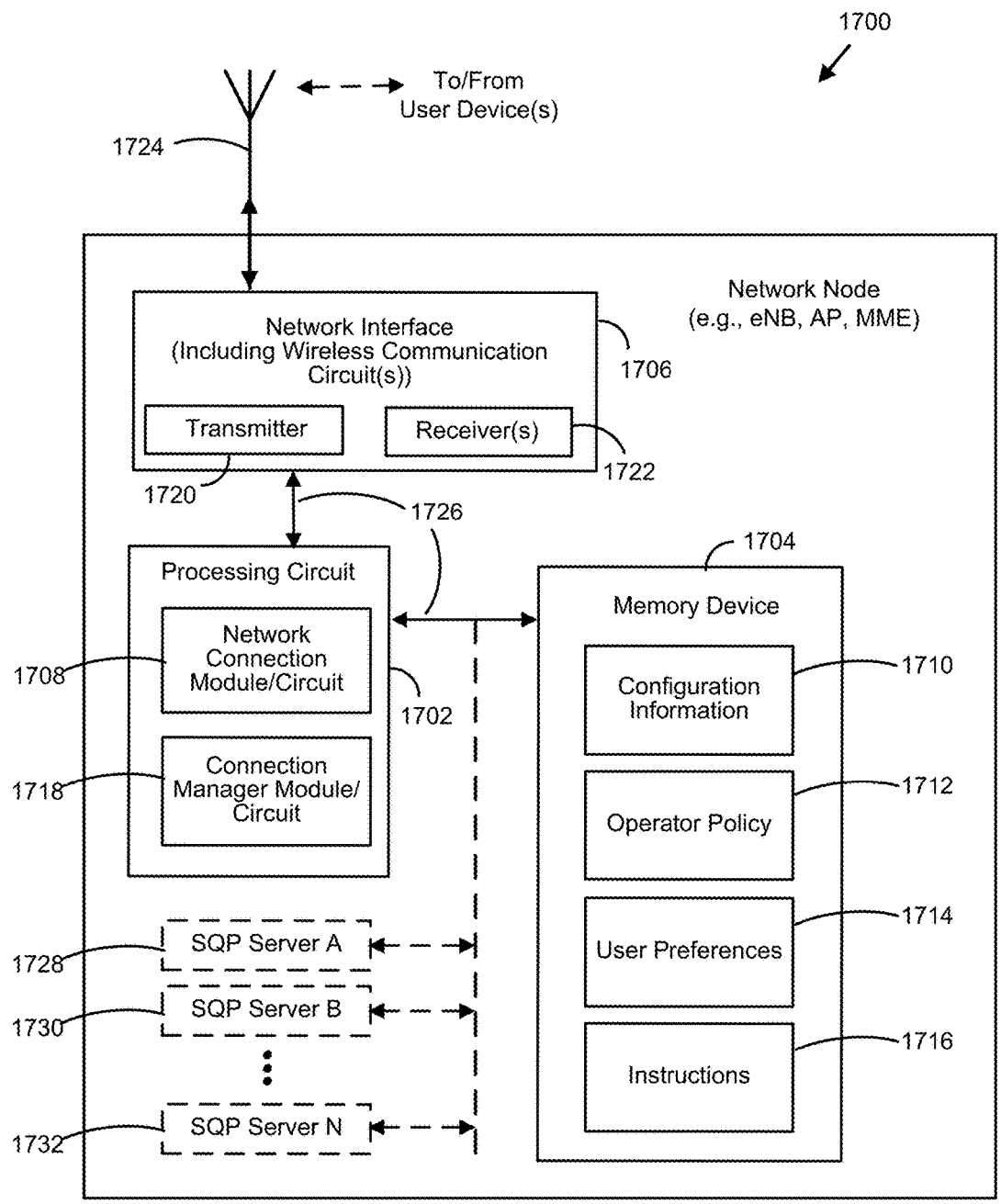
FIG. 17 is a functional block diagram of one aspect of an exemplary access node that may implement service query protocol.

FIG. 17 is a functional block diagram of one aspect of an exemplary network node 1700 that may implement service query protocol. The network node 1700 of FIG. 17 may be representative of a network access node (e.g., eNB, AP) and/or an MME. The network access node 1700 may generally include a processing circuit 1702 (e.g., processor, processing module, etc.) coupled to a memory circuit 1704 (e.g., memory, memory module, etc.), and a network interface 1706, where the network interface 1706 may include a wireless communication circuit.

The processing circuit 1702 may be configured to establish a wireless connection with, for example, client device(s) via the network interface 1706, to send and/or receive information to/from the client device(s). Transmission and/or reception of communication signals may be through an antenna 1724. One antenna 1724 is shown for illustrative purposes; however, it will be understood that the network access node 1700 may have one or more antennae 1724 to support, for example, multiple input multiple output (MIMO) operations. The processing circuit 1702 may be coupled to the memory circuit 1704 such that the processing circuit 1702 can read information from, and write information to, the memory circuit 1704. The memory circuit 1704 may include data representative of network access node configuration information 1710 of a present configuration of the network access node 1700 and/or any potential future configuration options of the network access node 1700. The memory circuit 1704 may further include data representative of operator policies 1712. The memory circuit 1704 may include data representative of operator preferences 1714. The memory circuit 1704 may include instructions 1716 that when executed by the processing circuit 1702 will cause the processing circuit 1702 to perform methods such as those described in the exemplary aspects disclosed herein.

The processing circuit 1702 may also include a network connection module/circuit 1708 for establishing a network connection (via the network interface 1706) with one or more client devices. The processing circuit 1702 may also include a connection manager module/circuit 1718, which may manage information relating to client device traffic steering, network access node configuration information 1710, operator policies 1712, and operator preferences 1714 to assist a client device in selecting and steering data to the network access node 1700.

The network interface 1706 may include one or more transmitters 1720 and one or more receivers 1722. The one or more transmitters 1720 may configured to send packets for two or more active communication sessions. The one or more receivers 1722 may be configured to allow the network access node 1700 to maintain two or more active communication sessions with one or more client devices.

The network access node 1700 may further include at least one communication bus 1726, which couples the various modules/devices of the network access node 1700 to one another.

Still further, in some aspects, the network access node may include one or more service query protocol (SQP) servers 1728, 1730, 1732. SQP servers 1728, 1730, 1732 may couple to the communication bus 1726 to, for example, permit the processing circuit 1702 to access data from, and write data to, the SQP servers 1728, 1730, 1732. SQP servers 1728, 1730, 1732 and their interconnection with the communication bus 1726 are represented in dashed line to illustrate that the SQP servers 1728, 1730, 1732 represent an optional aspect.

According to one or more features, the processing circuit 1702 may be configured to perform any or all of the processes, functions, steps and/or routines described herein. As used herein, the term "configured" in relation to the processing circuit 1702 may refer to the processing circuit 1702 being one or more of adapted, employed, implemented, or programmed to perform a particular process, function, step and/or routine according to various features described herein.

Exemplary Server

Figure 18:
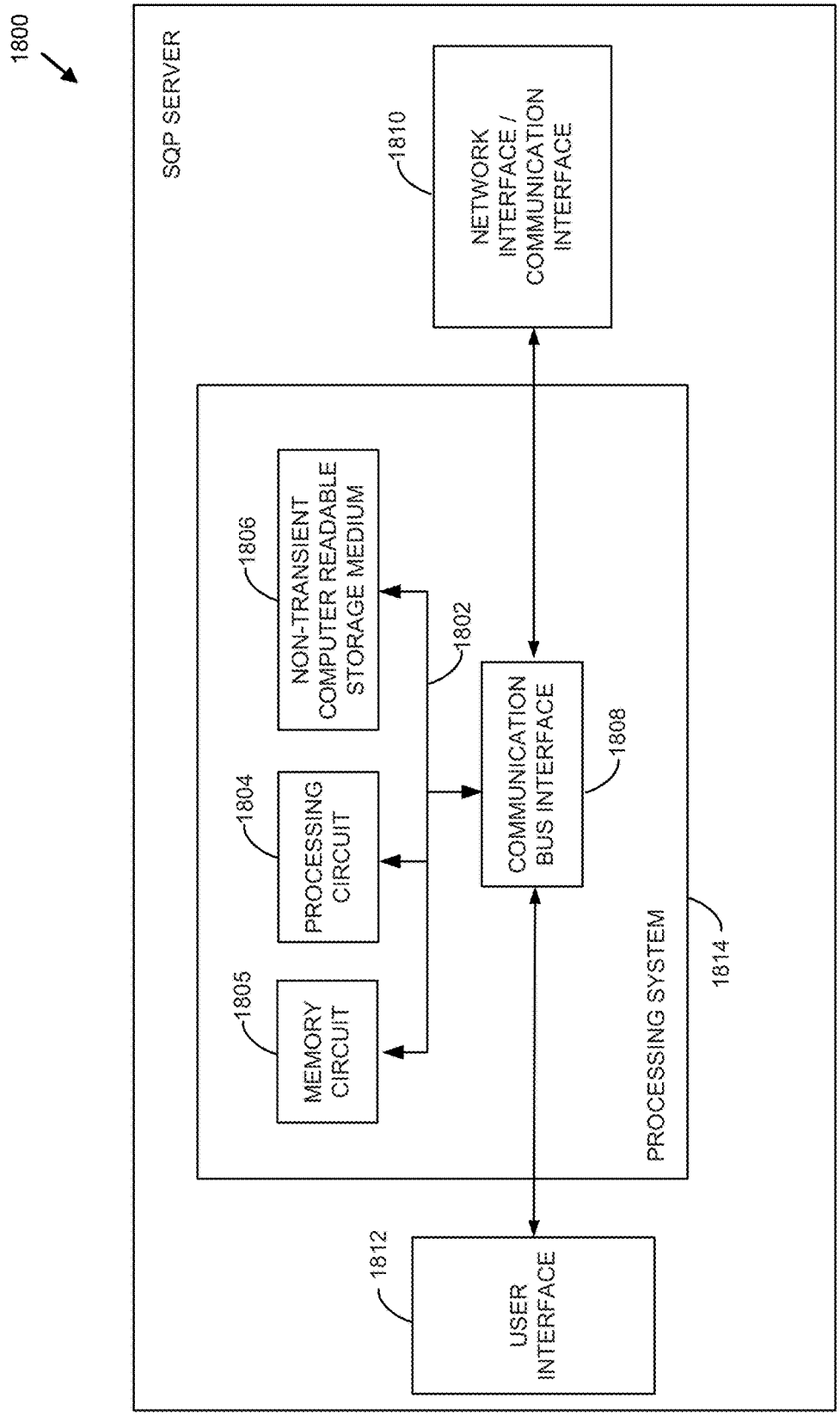
FIG. 18 is a functional block diagram of one aspect of an exemplary server that may implement service query protocol.

FIG. 18 is a functional block diagram of one aspect of an exemplary server that may implement service query protocol. The server may serve as an SQP server 1800. The SQP server 1800 may execute any of the various instructions needed to carry out the methods described in the aspects described herein, may store, in one or more non-transient computer-readable storage devices, any data, elements of information, service provider identifiers, network access node identifiers, and any instructions that may be useful in carrying out the methods of the aspects described herein.

The SQP server 1800 may include a network interface 1810, where the network interface 1810 may include a wireless communication circuit, a user interface 1812, and a processing system 1814. The processing system 1814 may include a processing circuit 1804 (e.g., processor), a memory circuit 1805 (e.g., memory device), a non-transient computer-readable storage medium 1806, a bus interface 1808, and a bus 1802. The processing system 1814 and/or the processing circuit 1804 may be configured to perform any of the steps, functions, and/or processes described and/or illustrated herein.

The processing circuit 1804 may be one or more processors (e.g., first processor, etc.) that are adapted to process data for the SQP server 1800. For example, the processing circuit 1804 may be a specialized processor, such as an application specific integrated circuit (ASIC) that serves as a means for carrying out any one of the operations described herein. The processing circuit 1804 serves as one example of a means for verifying authentication information, deriving authentication information, maintaining a table of connectivity access networks and/or service providers and associated parameters, establishing a secure channel, allowing execution, identifying a device, or establishing a secure channel. The processing circuit 1804 also serves as one example of a means for receiving and/or transmitting.

Examples of processing circuits 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing circuit 1804 is also responsible for managing the bus 1802, and executing software stored on the non-transient computer-readable storage medium 1806 and/or memory circuit 1805. The software, when executed by the processing circuit 1804, causes the processing system 1814 to perform the various functions, steps, and/or processes described and/or illustrated herein. The non-transient computer-readable storage medium 1806 may be used for storing data that is manipulated by the processing circuit 1804 when executing software.

The memory circuit 1805 may be non-volatile memory, such as but not limited to FLASH memory, magnetic or optical hard disk drives, etc. In some aspects, the memory may be volatile memory, such as DRAM (e.g., DDR SDRAM), SRAM, etc., that may be continuously powered so as to store the information indefinitely. The memory circuit 1805 serves as one example of a means for maintaining a table of connectivity access networks and/or service providers and associated parameters.

Software or instructions shall be construed broadly to mean software, instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transient computer-readable storage medium 1806. Examples of non-transient computer-readable storage medium 1806 may include a magnetic storage device (e.g., hard disk, floppy disk, magnetic strip), an optical disk (e.g., a compact disc (CD) or a digital versatile disc (DVD)), a smart card, a flash memory circuit (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The non-transient computer-readable storage medium 1806 may reside in the processing system 1814, external to the processing system 1814, or distributed across multiple entities including the processing system 1814. The non-transient computer-readable storage medium 1806 may be embodied in a computer program product. Also, the SQP server 1800 could interface with a computer-readable medium that could include, by way of example, a carrier wave, a transmission line, and any other suitable medium for sending software and/or instructions that may be accessed and read by a computer.

In the example of FIG. 18, the processing system 1814 may be implemented with a bus architecture, represented generally by the bus 1802. The bus 1802 may include any number of interconnecting buses and bridges depending on the application of the processing system 1814 and the overall design constraints. The bus 1802 links together various circuits including one or more processors (represented generally by the processing circuit 1804), the memory circuit 1805, and computer-readable media (represented generally by the non-transient computer-readable storage medium 1806). The bus 1802 may also link various other circuits such as timing sources, peripherals, voltage regulators, and power management circuits, which are well known in the art, and therefore, will not be described any further. A bus interface 1808 provides an interface between the bus 1802 and the network interface 1810 (if present). The bus interface 1808 serves as one example of a means for receiving and/or transmitting. The network interface 1810 provides a means for communicating with other apparatuses over a transmission medium. The network interface 1810 serves as one example of a means for receiving and/or transmitting. Depending upon the nature of the apparatus, a user interface 1812 (e.g., keypad, display, speaker, microphone, touchscreen display, etc.) may also be provided for the SQP server 1800.

Figure 19:
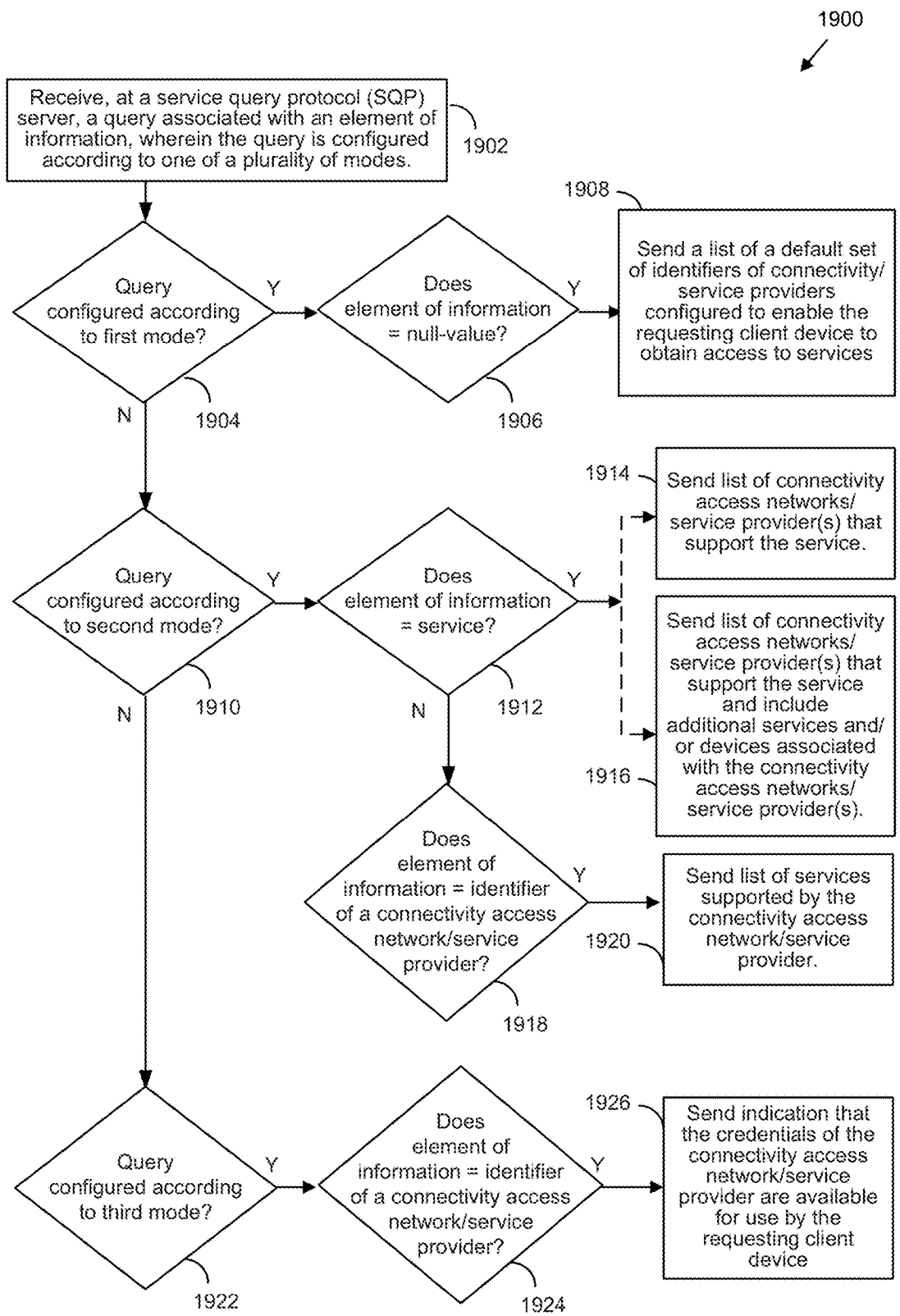
FIG. 19 is a first exemplary method operational in an exemplary server in accordance with an exemplary aspect described herein.

FIG. 19 is a first exemplary method 1900 operational in an exemplary server in accordance with an exemplary aspect described herein. The exemplary server may be similar, for example, to the exemplary server 1800 of FIG. 18. The exemplary server 1800 of FIG. 18 may be an SQP server. A service query protocol (SQP) query may be received at a server from, for example, a client device or an access node 1902. The SQP query may be associated with an element of information and may be configured according to one of a plurality of modes.

A determination may be made as to the whether the SQP query is configured according to a first mode, such as the exemplary first mode described above 1904. If the SQP query is determined to be configured according to the first mode, the element of information included in the SQP query may be determined 1906. If the element of information was determined to be a null-value, the SQP server may send a response 1908, which may include a list of a default set of identifiers of connectivity access network/service providers configured to enable the client device to obtain access to services. In one aspect, any SQP query may be a request for a default response when the element of information included in the SQP query is the null-value.

If the SQP query was determined to not be configured according to the first mode, then a determination may be made as to the whether the SQP query is configured according to a second mode, such as the exemplary second mode described above 1910. If the SQP query is determined to be configured according to the second mode, the element of information included in the SQP query may be determined 1912. If the element of information was determined to be a service (or one or more services), the SQP server may send one or more messages. For example, in one aspect the SQP server may send a response 1914, which may include a list of connectivity access networks/service provider(s) that support the service. In another aspect, the SQP server may send a response 1916, which may include the list of connectivity access networks/service provider(s) that support the service, and may also send an additional list (or may include in the first list) a list of services and/or devices supported by/associated with the connectivity access networks/service provider(s).

If the SQP query is determined to be configured according to the second mode (e.g., at 1910), but the element of information included in the SQP query was determined to not be a service (or one or more services) (e.g., at 1912), a second determination as to what the element of information represents may be made 1918. If the element of information included in the SQP query is determined to be an identifier of a connectivity access network/service provider, the SQP server may send a response 1920, which may include a list of services supported by the identified connectivity access network/service provider.

If the SQP query is determined to not be configured according to the second mode (e.g., at 1910), then a determination may be made as to the whether the SQP query is configured according to a third mode, such as the exemplary third mode described above 1922. If the SQP query is determined to be configured according to the third mode (e.g., at 1922), the element of information included in the SQP query may be determined 1924. If the element of information is determined to be an identifier of a connectivity access network/service provider (e.g., at 1924), then the SQP server may verify whether the credentials of the connectivity access network/service provider are available for use by the client device and if available for use may send a response 1926, which may include an indication that the credentials of the connectivity access network/service provider are available for use by the client device. Otherwise, the SQP server may send an indication that the credentials of the connectivity access network/service provider are not available for use by the client device, or may not send a response to the SQP query.

Additional modes for SQP queries are within the scope of the aspects described herein.

The determination of the mode of a given query may be accomplished in various ways. For example, in some aspects, a field in a header may be used to identify the mode of a given query (e.g., Mode=1, 2, or 3). In some aspects, the data associated with a given query may be analyzed and the mode of the query may be determined from such an analysis. For example, an analysis of the data field of a query having a null-value in the data field may result in a determination that query was presented in what is described herein as a first mode, where a response including a default listing of identifiers of connectivity access networks and/or service providers is sought in response to the query. An analysis of the data field of a query having a service identifier value in the data field may result in a determination that the query is presented in what is described herein as a second mode, where a response including a set of identifiers of connectivity access networks and/or service providers that support the service is sought in response to the query. An analysis of the data field of a query having an identifier of a connectivity access network and/or a service provider in the data field may result in a determination that the query is also presented in what is described herein as a second mode, where a response including a list of services supported by the connectivity access network and/or the service provider is sought in response to the query. An analysis of the data field of a query having an identifier of a connectivity access network and/or service provider where the analysis further indicates that the identifier of a connectivity access network and/or service provider was not broadcast from an access node (e.g., the connectivity access network and/or service provider is identified as not wanting its identifier to be included in a default response to a query or as wanting its identifier to be hidden), may result in a determination that the query is presented in what is described herein as a third mode, where a response indicating that the credentials of the connectivity access network and/or service provider are (or are not) available for use by the requesting client device is sought in response to the query.

In some aspects, the response, such as those identified by reference numbers 1908, 1914, 1916, 1920, and 1926, may be sent prior to establishment of an authenticated connection between the client device and a network via an access node.

Figure 20:
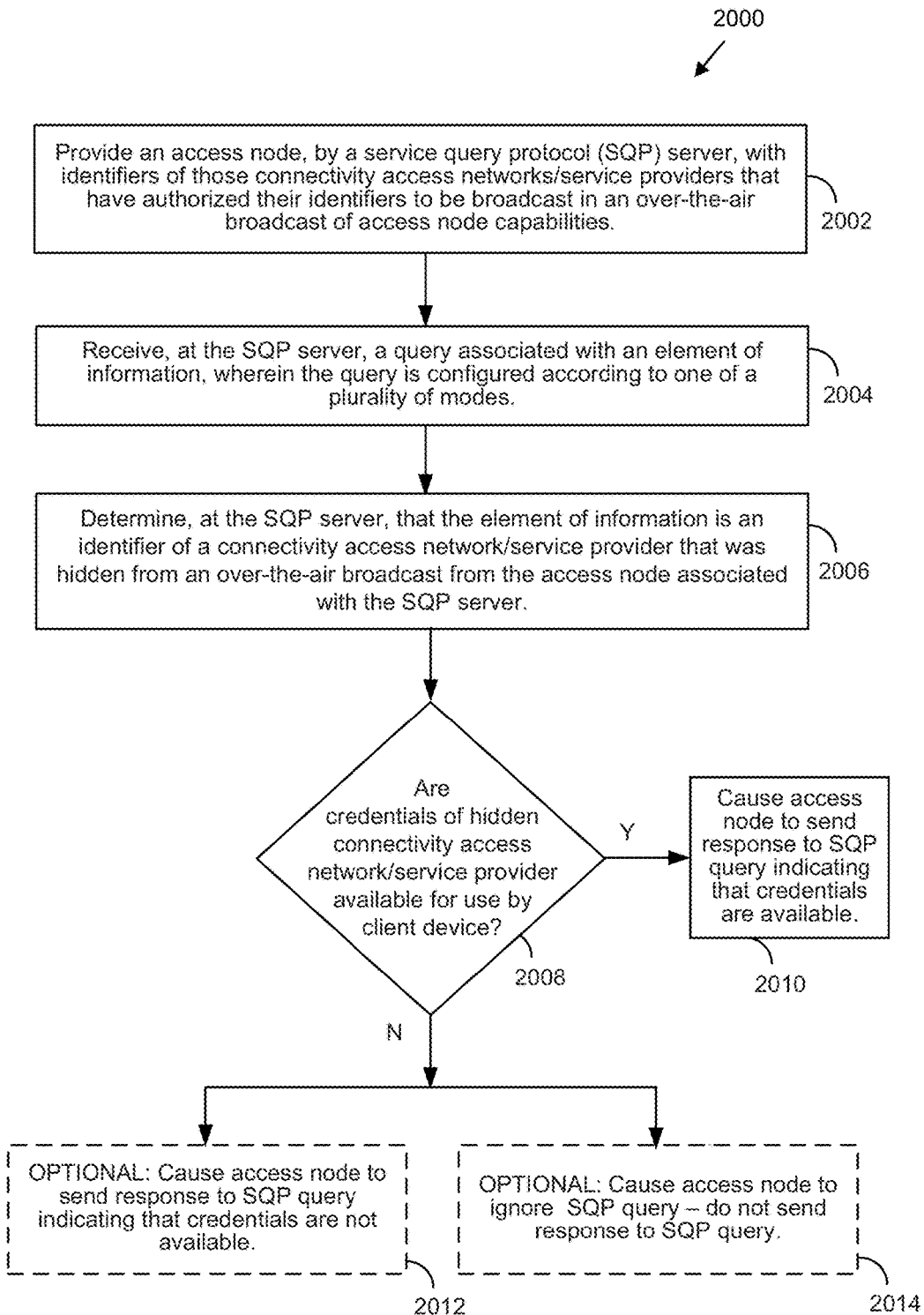
FIG. 20 is a second exemplary method operational in an exemplary server in accordance with an exemplary aspect described herein.

FIG. 20 is a second exemplary method operational in an exemplary server in accordance with an exemplary aspect described herein. The exemplary server may be similar, for example, to the exemplary server 1800 of FIG. 18. The exemplary server 1800 of FIG. 18 may be an SQP server. A server (e.g., an SQP server) may store data representative of identifiers of a plurality of connectivity access networks and/or service providers. A subset of the plurality of connectivity access networks and/or service providers may not want to have to be associated with a public broadcast of their identifiers. In other words, a subset of the plurality of connectivity access networks and/or service providers may not want the public to know that they are available for access at a given access node. In some aspects, this subset of the plurality of connectivity access networks and/or service providers are said to wish to remain hidden. As described above, features of a server (e.g., SQP server) may permit a given connectivity access network and/or service provider to indicate its desire to remain hidden. In aspects described above, one or more flags may be set to indicate that the connectivity access network and/or service provider is to be hidden. In such aspects, the data representative of identifiers of the connectivity access networks and/or service providers that wish to remain hidden are omitted from beacons and other broadcasts of access node capabilities (referred to hereinafter generally as over-the-air message broadcasts). Accordingly, an access node associated with a server (e.g., SQP server) may send and over-the-air message broadcast that does not include data representative of all identifiers of the plurality of connectivity access networks and/or service providers associated with the access node.

Turning now to FIG. 20, according to one aspect, a server (e.g., SQP server) may provide identities to an access node of a plurality of connectivity access networks/service providers that are associated with the access node and may also indicate which of those connectivity access nodes/service providers wish to have their identifiers omitted from (or hidden from) over-the-air message broadcasts. Alternatively, the server (e.g., SQP server) may provide identities to the access node of only those ones of a plurality of connectivity access networks/service providers that are associated with the access node that have not indicated that they wish to have their identifiers omitted from (or hidden from) over-the-air message broadcasts. Therefore, in accordance with either of the preceding methods, a server (e.g., SQP server) may provide an access node with a list of identifiers of the connectivity access network/service providers for inclusion in an over-the-air message broadcast of identifiers 2002. The identity of each omitted connectivity access network/service provider may be known to the access node, but is not broadcast. In this way, the identity of each omitted connectivity access network/service provider may be hidden from any client device obtaining the message.

The server (e.g., SQP server) may receive a query associated with (e.g., including) an element of information, wherein the query is configured according to one of a plurality of modes 2004. According to various aspects, the query may have been sent from a client device or from an access node.

In one exemplary scenario, the query may have been derived by the client device in response to obtaining an over-the-air message broadcast from the access node. The client device may configured to recognize, although a service provider is not advertised in a broadcast from an access node, that the service provider may be supported by the access node, or is likely to be supported by the access node. Alternatively, the client device may be programmed to derive the query based on certain variables, such as, for example, geographic location or venue. Alternatively, for example, if the access node broadcasts an identity of a service provider, the client device may recognize that the service provider has a private identifier that is not publicly broadcast. If the client device has a need to access the private network associated with the service provider, the client device may derive an SQP query based on, for example, the above described third mode, where the derived query would include, as an element of information within the query, the identifier of the private identifier of the service provider that was not broadcast by the access node. Other ways to cause a client device to derive an SQP query to search for a service provider whose identity was not included in an over-the-air message broadcast are within the scope of the aspects described herein.

According to one aspect, the server (e.g., SQP server) may determine that the element of information is an identifier of a connectivity access network/service provider that was hidden from an over-the-air message broadcast from the access node associated with the SQP server 2006. According to such an aspect, the SQP server may determine whether credentials of the connectivity access network/service provider are available for use by the client device 2008.

If the credentials of the connectivity access network/service provider are available for use by the client device, the server may cause the access node to send a response to the SQP query indicating that the credentials are available for use by the client device 2010. If the credentials of the connectivity access network/service provider are not available for use by the client device, the SQP server may cause the access node to respond. The response may be, for example, a response to the SQP query indicating that the credentials are not available for use by the client device 2012. The response may alternatively be, for example, to cause the access node to ignore the SQP query (i.e., do not send the network access node a response to the SQP query) 2014.

One or more of the components, steps, features, and/or functions illustrated herein may be rearranged and/or combined into a single component, step, feature or function or embodied in several components, steps, or functions. Additional elements, components, steps, and/or functions may also be added without departing from the disclosure. The algorithms described herein may also be efficiently implemented in software and/or embedded in hardware.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. Similarly, the term "coupled" is used herein with reference to modules/circuits/functions that may electrically and/or mechanically interact with each other in order to achieve a result. The term "null-value" may be used herein to refer to a zero value, an empty value, an empty string, an unknown value, or a predetermined known value.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

The various features of the disclosure described herein can be implemented in different systems without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

In the description, elements, module/circuit/functions, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the aspects may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory circuits and/or other machine-readable mediums and, processor-readable mediums, and/or computer-readable mediums for storing information. The terms "machine-readable medium," "computer-readable medium," and/or "processor-readable medium" may include, but are not limited to non-transient mediums such as portable or fixed storage devices, optical storage devices, and various other mediums capable of storing, containing, or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, aspects may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or obtaining information, data, arguments, parameters, or memory contents. Information, arguments, parameters, data, etc. may be passed, forwarded, or sent via any suitable means including memory sharing, message passing, token passing, network transmission, etc.

The various illustrative logical blocks, modules, module/circuit/functions, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing aspects described herein, is considered a special purpose processor for carrying out such aspects. Similarly, a general-purpose computer is considered a special purpose computer when configured for carrying out aspects described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, module/circuit/functions, and algorithm steps described in connection with the aspects disclosed herein may be implemented as electronic hardware, computer software, or combinations of both. To clearly illustrate this interchangeability of hardware and software, various illustrative components, blocks, modules, module/circuit/functions, and steps have been described above generally in terms of their functionality.

Whether such functionality is implemented as hardware, software, or a combination thereof depends upon the particular application and design selections imposed on the overall system.

The various features of the invention described herein can be implemented in different systems without departing from the invention. It should be noted that the foregoing aspects are merely examples and are not to be construed as limiting the invention. The description of the aspects is intended to be illustrative, and not to limit the scope of the claims. As such, the present teachings can be readily applied to other types of apparatuses and many alternatives, modifications, and variations will be apparent to those skilled in the art.

What is claimed is:

1. A method, operational at a client device, comprising:
    determining, at the client device, whether to obtain an element of information related to a service parameter from an access node, wherein the service parameter includes one or more elements of information, wherein the one or more elements of information describe one or more network capabilities supported by a serving network associated with a first serving network identifier, wherein the access node is shareable by a plurality of connectivity access networks;
    selecting, based on a result of the determining, the element of information;
    deriving a query associated with the element of information, wherein the query is configured according to one of a plurality of modes and includes the first serving network identifier; and
    sending the query as an over-the-air message from the client device to the access node.

2. The method of claim 1, further comprising:
    obtaining, at the client device, prior to determining whether to obtain the element of information, an over-the-air message that indicates that the access node is configured to support the query.

3. The method of claim 2, wherein the over-the-air message indicates that the access node is configured to support the plurality of modes.

4. The method of claim 1, wherein when the query is configured according to a first mode of the plurality of modes and the element of information is a null-value, the method further includes obtaining a default response including a listing of identifiers of connectivity access networks and/or service providers in response to the sending of the query.

5. The method of claim 4, wherein the listing includes only those connectivity access networks and/or service providers that are configured to enable the client device to obtain access to services.

6. The method of claim 1, wherein when the query is configured according to a second one of the plurality of modes and the element of information is a service, the method further includes obtaining a set of identifiers of connectivity access networks and/or service providers that support the service.

7. The method of claim 6, further including obtaining a list of additional services supported by the identified connectivity access networks and/or service providers that support the service.

8. The method of claim 6, further including obtaining a list of devices supported by the identified connectivity access networks and/or service providers that support the service.

9. The method of claim 1, wherein when the query is configured according to a second one of the plurality of modes and the element of information is an identifier of a connectivity access network and/or a service provider, the method further includes obtaining a list of services supported by the connectivity access network and/or the service provider.

10. The method of claim 1, wherein when the query is configured according to a third one of the plurality of modes and the element of information is an identifier of a connectivity access network and/or service provider, the method further includes obtaining an indication of whether credentials of the connectivity access network and/or service provider are available for use by the client device.

11. The method of claim 10, wherein the identifier of the connectivity access network and/or service provider was not provided to the client device in an over-the-air message broadcast received from the access node prior to determining whether to obtain the element of information related to the service parameter from the access node.

12. The method of claim 1, wherein the element of information is a subset of a set of elements of information stored in a server that implements service query protocol (SQP).

13. A client device, comprising:
    a network interface; and
    a processing circuit coupled to the network interface, the processing circuit configured to:
        determine whether to obtain an element of information related to a service parameter from an access node, wherein the service parameter includes one or more elements of information, wherein the one or more elements of information describe one or more network capabilities supported by a serving network associated with a first serving network identifier, wherein the access node is shareable by a plurality of connectivity access networks;
        select the element of information related to the service parameter if it was determined to obtain the element of information, the element of information to be associated with a query;
        derive the query, wherein the query is configured according to one of a plurality of modes and includes the first serving network identifier; and
        send the query as an over-the-air message from the client device to the access node.

14. The client device of claim 13, wherein the processing circuit is further configured to configure the query according to a first mode of the plurality of modes and the element of information is a null-value.

15. The client device of claim 13, wherein the processing circuit is further configured to configure the query according to a second one of the plurality of modes and the element of information is a service.

16. The client device of claim 13, wherein the processing circuit is further configured to configure the query according to a second one of the plurality of modes and the element of information is an identifier of a connectivity access network and/or a service provider.

17. The client device of claim 13, wherein the processing circuit is further configured to configure the query according to a third one of the plurality of modes and the element of information is an identifier of a connectivity access network and/or service provider that was not identified in a broadcast made by an access node.

18. A method, operational at a server coupled to an access node, comprising:
    obtaining, at the server from a client device, a query associated with an element of information related to a service parameter, wherein the service parameter includes one or more elements of information wherein the one or more elements of information describe one or more network capabilities supported by a serving network associated with a first serving network identifier, wherein the access node is shareable by a plurality of connectivity access networks, and wherein the query is configured according to a mode among a plurality of modes and includes the first serving network identifier;

determining a response to the query based on the element of information associated with the query and the mode in which the query is configured; and sending the response to the query.

19. The method of claim 18, further comprising:
broadcasting, prior to obtaining the query, a message that does not include identifiers of all connectivity access networks and/or service providers associated with the access node, wherein an identity of an omitted connectivity access network and/or service provider is not broadcast to hide the identity from the client device.

20. The method of claim 19, wherein if the query includes a connectivity access network and/or service provider identifier that was not included in the message, the response to the query includes an indication of whether credentials of the connectivity access network and/or service provider are available for use by the client device.

21. The method of claim 18, wherein according to a first one of the plurality of modes, when the element of information is a null-value, the response to the query will be a default response including a listing of identifiers of connectivity access networks and/or service providers sharing the access node.

22. The method of claim 18, further comprising:
sending a message that indicates that the access node supports a plurality of connectivity access networks.

23. The method of claim 18, wherein when the query is configured according to a second one of the plurality of modes and the element of information is a service, the response to the query includes a set of identifiers of connectivity access networks and/or service providers that support the service.

24. The method of claim 23, wherein the response to the query further includes a list of additional services supported by the identified connectivity access networks and/or service providers that support the service.

25. The method of claim 23, wherein the response to the query further includes a list of devices supported by the identified connectivity access networks and/or service providers that support the service.

26. The method of claim 18, wherein when the query is configured according to a second one of the plurality of modes and the element of information is an identifier of a connectivity access network and/or a service provider, the response to the query includes a list of services supported by the connectivity access network and/or the service provider.

27. The method of claim 18, wherein when the query is configured according to a third one of the plurality of modes and the element of information is an identifier of a connectivity access network and/or a service provider, the response to the query includes an indication of whether credentials of the connectivity access network and/or the service provider are available for use by the client device.

28. A server configured to be coupled to an access node, the server comprising:
a network interface; and
a processing circuit coupled to the network interface, the processing circuit configured to:
obtain a query associated with an element of information related to a service parameter, wherein the service parameter includes one or more elements of information, wherein the one or more elements of information describe one or more network capabilities supported by a serving network associated with a first serving network identifier, wherein the access node is shareable by a plurality of connectivity access networks, and wherein the query is configured according to one of a plurality of modes and includes the first serving network identifier;
determine a response to the query based on the element of information associated with the query and the mode of the query; and
send the response to the query.

29. The server of claim 28, wherein when the query is configured according to one of:
a first one of the plurality of modes and the element of information is a null-value, the processing circuit is further configured to configure the response to the query to be a default response including a listing of identifiers of connectivity access networks and/or service providers sharing an access node;
a second one of the plurality of modes and the element of information is a service, the processing circuit is further configured to configure the response to the query to include a set of identifiers of connectivity access networks and/or service providers that support the service;
a second one of the plurality of modes and the element of information is an identifier of a connectivity access network and/or a service provider, the processing circuit is further configured to configure the response to the query to include a list of services supported by the connectivity access network and/or the service provider; and
a third one of the plurality of modes and the element of information is an identifier of a connectivity access network and/or a service provider, the processing circuit is further configured to configure the response to the query to include an indication of whether credentials of the connectivity access network and/or the service provider are available for use by a client device.

30. A method, operational at a client device, comprising:
obtaining, at the client device, a broadcast from an access node, wherein the client device selectively obtains a connection from one of a plurality of connectivity access networks through the access node;
deriving, in response to obtaining the broadcast, a query seeking to obtain a list of serving network identifiers representing one or more of the plurality of connectivity access networks that support a service sought by the client device and identified in the query; and
sending the query to the access node.

* * * * *